US012525097B2

(12) United States Patent
Nelson et al.

(10) Patent No.: US 12,525,097 B2
(45) Date of Patent: Jan. 13, 2026

(54) MULTI-PLAYER TOURNAMENT AND COMPETITION

(71) Applicant: IGT, Las Vegas, NV (US)

(72) Inventors: Dwayne Nelson, Las Vegas, NV (US); Paul A. Johnson, Reno, NV (US)

(73) Assignee: IGT, Las Vegas, NV (US)

( * ) Notice: Subject to any disclaimer, the term of this patent is extended or adjusted under 35 U.S.C. 154(b) by 206 days.

(21) Appl. No.: 18/104,861

(22) Filed: Feb. 2, 2023

(65) Prior Publication Data

US 2024/0265782 A1 Aug. 8, 2024

(51) Int. Cl.
*A63F 9/24* (2006.01)
*G07F 17/32* (2006.01)

(52) U.S. Cl.
CPC ...... *G07F 17/3281* (2013.01); *G07F 17/3216* (2013.01); *G07F 17/3258* (2013.01); *G07F 17/3265* (2013.01)

(58) Field of Classification Search
None
See application file for complete search history.

(56) References Cited

U.S. PATENT DOCUMENTS 6,312,333 B1 11/2001 Acres
7,841,938 B2 * 11/2010 Gatto ...................... G07F 17/32 463/16
8,021,230 B2 * 9/2011 Baerlocher ......... G07F 17/3232 463/19
9,269,227 B2 * 2/2016 Jackson .................. G07F 17/32
11,276,276 B2 * 3/2022 Nelson ................ G07F 17/3244
11,380,162 B2 * 7/2022 Danielson ........... G07F 17/3244
2002/0183105 A1 * 12/2002 Cannon ................... G07F 17/32 463/16
2003/0092483 A1 5/2003 Bennett et al.
2010/0004053 A1 * 1/2010 Acres .................. G07F 17/3274 463/25
2010/0197385 A1 * 8/2010 Aoki ................... G07F 17/3225 463/31
2019/0333316 A1 * 10/2019 Nelson ................ G07F 17/3211
2019/0385402 A1 12/2019 Marks
2021/0134111 A1 5/2021 Danielson et al.
2022/0319274 A1 * 10/2022 Danielson ............... G07F 17/34

FOREIGN PATENT DOCUMENTS

NZ 520756 5/2004

OTHER PUBLICATIONS

"Slot Accounting System Protocol," IGT, 2006, 5 pages.

* cited by examiner

*Primary Examiner* — Sunit Pandya
(74) *Attorney, Agent, or Firm* — Sheridan Ross P.C.

(57) ABSTRACT

In certain embodiments, the present disclosure relates to a gaming system that enables a common gaming device to engage multiple players in a common or separate gaming session(s) that can be configured as a multi-player tournament.

20 Claims, 26 Drawing Sheets

MULTI-PLAYER TOURNAMENT AND COMPETITION

BACKGROUND

The present disclosure is related to gaming systems and devices and, in particular, the use of such devices in connection with multi-player tournaments.

In a typical casino, a player can play a variety of games of chance and/or skill on various types of electronic gaming machines ("EGM"). Most games have mathematically determined odds that ensure that the house has an advantage over the players. This advantage is called the house edge. Payout is the percentage of funds ("winnings") returned to players. In games such as poker where players play against each other, the house takes a commission called the rake.

At the core of any EGM is a random number generator When a button or touch screen is activated, the computer accesses the numbers generated at that point in time and converts them to a display on the screen. The numbers correspond to a position on a "reel map"—the number and order of symbols on each virtual reel—and a "pay table"—the prizes awarded for each combination of symbols appearing on a line.

EGMs are typically configured for one player at a time to play a gaming session. Multiple players require multiple EGMs to play simultaneous gaming sessions that are independent of one another.

BRIEF SUMMARY

In certain embodiments, the present disclosure relates to a gaming system that enables a common gaming device to engage multiple players in a common gaming session or separate gaming sessions.

In some embodiments, a system and method includes the operations/steps of receiving, by a first user interface of a first electronic gaming device, first credit information regarding a first credit amount associated with a first player; receiving, by the first user interface of the first electronic gaming device, second credit information regarding a second credit amount associated with a second player; updating, by a processor, an electronic record associated with a first credit meter associated with the first player to reflect the first credit information, a second credit meter associated with the second player to reflect the second credit information, and a joint credit meter associated with the first and second players to reflect the first and second credit information; and simultaneously displaying, by a display of the first electronic gaming device, the first and second credit amounts and a joint credit amount derived from the first and second credit amounts.

In some embodiments, a gaming server comprises first and second player user interfaces for first and second players, respectively; a processor coupled with the first and second player user interfaces; and a memory coupled with and readable by the processor and storing therein a set of instructions which, when executed by the processor, causes the processor to: receive a request to initiate concurrent first and second gaming sessions with the first and second players; initiate the concurrent first and second gaming sessions; upon occurrence of a gaming event, terminate the first and second gaming sessions; compare a first credit amount of the first player with a second credit amount of the second player; and based on comparison of the first and second credit amounts, update an electronic record associated with one of the first and second players to reflect an award.

In some embodiments, a gaming server comprises a network communications interface in communication with a gaming device; a processor coupled with the network communications interface; and a memory coupled with and readable by the processor and storing therein a set of instructions which, when executed by the processor, causes the processor to: receive, from a gaming device and through the network communications interface, a first electronic message comprising an identifier of the gaming device, a first identifier of a first player in a gaming session, and a first description of a first game event of the first player in the gaming session; update a first electronic record associated with the gaming session to reflect the first game event; receive, from the gaming device and through the network communications interface, a second electronic message comprising the identifier of the gaming device, a second identifier of a second player in the gaming session, and a second description of a second game event of the second player in the gaming session; update a second electronic record associated with the gaming session to reflect the second game event; at a conclusion of the gaming session, receive a third electronic message comprising the identifier of the gaming device, one of the first and second identifiers associated with a winning player, and a third description of a third game event, the third description indicating an award to be transferred to the winning player; and updating a third electronic record of the winning player to reflect transfer of the award.

Additional features and advantages are described herein and will be apparent from the following Description and the figures.

DETAILED DESCRIPTION

Figure 1C:
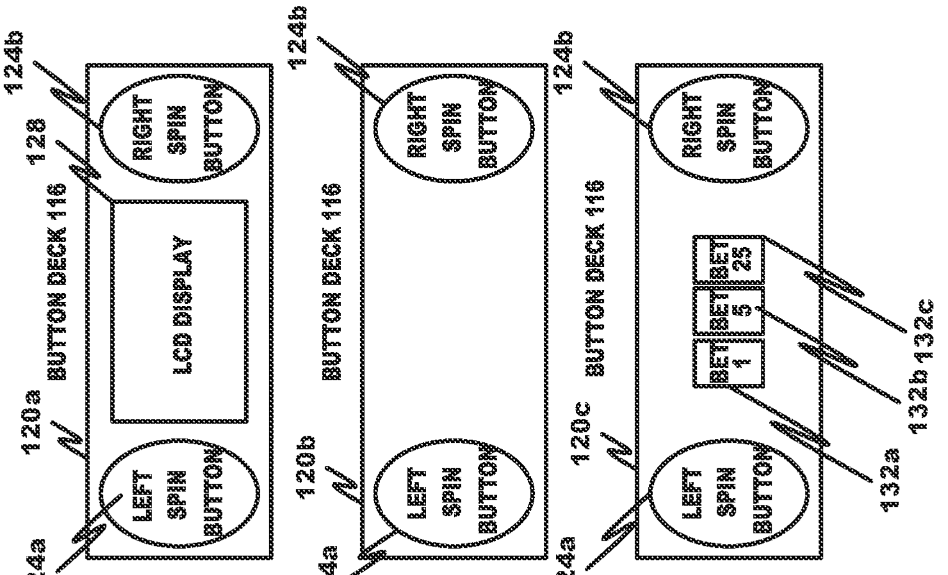
FIG. 1C depicts various button deck configurations in accordance with embodiments of the present disclosure.

Embodiments of the present disclosure will be described in connection with a gaming system having a capability to create and manage multi-player gaming sessions in which players compete against each other. For example, two (or more) players can enter a competition, much like a tournament. The players play for a certain amount of time, a certain number of game plays or until some other gaming event happens (hand pay triggered, out of credits, etc.). At the end of the session a winning player is chosen, such as the person with the most credits at the end of the session and the credit amount balances of the other (losing or nonwinning players) are transferred to the winning player. While certain embodiments of the present disclosure will reference the use of gaming devices, such as an Electronic Gaming Machine (EGM), Electronic Gaming Table (EGT), virtual gaming machine, or video gaming gambling machine (VGM), as gaming devices, it should be appreciated that embodiments of the present disclosure can be used with any computer-controlled gaming device or collection of gaming devices or other devices controlled by a gaming server.

By way of illustration, an EGM receives a request to initiate concurrent first and second gaming sessions with the first and second players. In response, the EGM initiates the concurrent first and second gaming sessions and, upon occurrence of a gaming event, terminates the first and second gaming sessions. The first and second gaming sessions can terminate based on occurrence of a common event or different events depending on the application. The EGM compares a first credit amount of the first player with a second credit amount of the second player, the first credit amount being greater than the second credit amount and, based on the comparison, updates an electronic record associated with the first player to transfer an award from the second player to the first player.

The currently active gaming sessions on the common gaming device can be played simultaneously or alternately by the identified players on the given gaming device. In the former case, each player would have a separate set of displays and separate user interface to interact with the game controller for his or her gaming session. In the latter case, each player would use a common set of displays and common user interface to interact at different or discrete time intervals with the game controller for his or her gaming session. Stated differently, in a first operating mode a first player interacts with a user interface of the gaming device and receives first gaming information for a first gaming session on a set of displays of the gaming device and, in a second operating mode occurring at a nonoverlapping time interval relative to the first operating mode, a second player interacts with the user interface of the gaming device and receives second gaming information for a second gaming session on the set of displays of the gaming device The credit balances and award can be in the form of money and/or loyalty or social network or media point(s) or other non-monetary unit(s). As used herein, a "loyalty point" refers to points that can be earned through designated activities or loyalty point initiation events at a gaming establishment, which activities can be tracked by means of tracking usage of a virtual or physical player loyalty card or associated loyalty account. Such establishments include casinos, hotels where gaming activities are provided, stores where gaming activities are permitted, Internet-based gaming activities, and the like. Designated activities can include, but are not limited to, playing games or participating in gaming sessions, such as playing gaming machines, card games (such as pai gow poker, baccarat, and poker), table games (such as roulette, craps, and keno), lotteries, betting on public event outcomes, etc. and other predetermined gaming activities. Other patronage activities at gaming establishments may accrue loyalty points, such as purchases of goods and services at the casino. Loyalty points commonly represent a form of credit accrued for patronage. The points can be redeemed for a variety of goods or services (or translated to other forms of credit) within a gaming establishment or affiliated establishment.

Typically, a loyalty point award is independent of the outcome of the game or gaming session but is based on an amount of monetary expenditure, such as for wagers on a gambling machine, wagers on table games, spend at various establishments in a casino (e.g., spa, restaurants, night clubs, etc.), hotel, and the like. Loyalty points can be not only player loyalty points but also free play (extra credit, non-cashable credits, and the like), gift points, comp dollars and others. Some of these points may be visible to players, while some may be visible to only casino staff. Some points may only be able to be used to fund certain types of free or incentivized activity at certain locations (e.g., slot machines), while not supporting free or incentivized player activity at other locations (e.g., the spa). Some points may have expiration times, while others may not have any expiration. The points can be redeemed for bonus cash or other rewards. Some loyalty programs use gamification, where the player needs to complete certain missions, or activities, to access the benefits.

The gaming sessions can be the same or different types and use the same or different pay tables. For example, the first player can play one of slots, video poker, keno, roulette, blackjack, bingo, sports wagering or micro-wagering, horse racing, craps, a table game, an electronic table game, or other social or gambling game while the second player plays a different one of slots, poker, keno, bingo, sports wagering, horse racing, craps, a table game, an electronic table game, or other social or gambling game. By way of further illustration, the gaming sessions, whether playing the same or different types of games, can use the same or different pay tables. While the contents of a pay table can vary according to an EGM's and game type's complexity, a pay table typically comprises all of a game's information, including all of the winning gaming outcomes (e.g., pay lines), rules, bonuses, betting requirements, and probability and award for each winning gaming outcome. A pay table can include, for example, a number of paylines (e.g., patterns on the reels for each winning combination), and probability of each as a game outcome, a list of prizes and payouts, betting requirements, and the symbols on the reels. A payline in slots is typically a line (straight or zig-zagged) that crosses one symbol on each reel or the combination of symbols on the slot machine reels that the player is paid out for if he has made a bet on that combination. To be winning sequence, any combination on the reels must have at least two identical symbols in a row, and the first one must occur on the first reel unless otherwise stated. In any other case, the combination does not pay out Because the pay table feature displays all possible winning outcomes, the table commonly shows for each winning combination of symbols in a specific slot game and the number of coins bet how many coins (or credits) the bettor will win. Some pay tables may contain more or fewer data.

Multiple credit meters can be used to manage accounting of game credits in response to receipt of credit information, such as coin-in and other cash or point transfers to the EGM and gaming activity. The players can start with the same credit balance. At the start of the tournament, the credit meter for the gaming device can be divided in a determined manner with each player starting with the same or different credit balance. The players can play from the same or a common credit meter. When one of the players notifies the gaming device, money and/or loyalty points is/are taken from a common or joint credit meter. The players can separately enter money into the gaming device. The gaming device can prompt each of the players to insert money or transfer money or loyalty points into the gaming device and associate the transferred cash or loyalty points with a particular player.

In some embodiments, the first and second players have first and second credit meters, respectively, tracking corresponding first and second credit amounts and a joint credit meter to track a combination of the first and second credit amounts and provide a joint credit amount that is not available for player wagering but is set aside for distribution between the first and second players upon termination of the first and second gaming sessions. The EGM can provide, at the same or different times, first and second credit meter displays for the first and second credit meters, the first credit meter display indicating the first credit amount which is available for expenditure by the first player on the EGM to play at least one game in the first gaming session and the second meter display indicating the second credit amount which is available for expenditure by the second player on the EGM to play at least one game in the second gaming session, and simultaneously a joint credit meter display to reflect the first and second credit information. In response to transfer of the award at termination of the first and second gaming sessions, a transfer of credits to the credit meter of the winning player from the credit meter of the losing player is made without causing a change to the joint credit meter.

By way of illustration, the EGM can include first and second player stations for the first and second players with the joint credit amount being the mathematical sum of the first and second credit amounts. In response to the EGM receiving third credit information indicating a change in one of the first and second credit amounts, the EGM updates the electronic record associated with a corresponding one of the first and second credit meters to reflect the third credit information and the joint credit meter to reflect the third credit information and simultaneously displays a changed one of the first and second credit amounts, the other of the (unchanged) first and second credit amounts, and a changed joint credit amount. The change in the third credit information can include, for instance, a first wager amount deducted from the first credit meter for a play of a first wagering game of the EGM, a second wager amount deducted from the second credit meter for a play of a second wagering game of the EGM, an amount added to the first credit meter from a play of the first wagering game, an amount added to the second credit meter from a play of the second wagering game, a cash-out of the first credit meter, a cash-out of the second credit meter, a first player deposit of a first amount of funds to the first credit meter, and a second player deposit of a second amount of funds to the second credit meter.

The credit information used to generate the balances of each of the first and second credit meters can be managed in different ways. In one example, an initial credit amount balance of each of the first and second credit meters is the product of dividing in a determined manner (e.g, equally) a total wager credit available on the EGM (inputted by one player or jointly by both of the players) between the first and second players. During gameplay, the first and second credit amounts would be adjusted differently and have different relative credit amounts based on different game activities of the first and second players. In another example each player, after being authenticated successfully, independently transfers cash and/or Loyalty points to his or her respective credit meter. This can be done for example by the EGM enabling the first and second players, after being authenticated, to toggle back and forth between them to enable the EGM to determine which cash and/or loyalty point transfer is associated with which player. In other words, in a first mode the EGM receives first credit information for the authenticated first player and associates the first credit information with a first credit balance on the first credit meter and in a different second mode the EGM receives second credit information for the authenticated second player and associates the second credit information with a second credit balance on the second credit meter. In another example, the first and second players, after one or both are authenticated successfully, jointly transfer cash and/or loyalty points to the EGM, without the EGM distinguishing between the players, and then command the EGM on how to divide up the total transferred cash and/or loyalty points between the first and second credit meters.

In another example, the first and second players, after one or both are authenticated successfully, transfer cash and/or loyalty points to a point credit meter without the EGM knowing how much was contributed by each player and the joint credit meter, unlike the joint credit meter in the former embodiments, is used jointly for wagering by the first and second players in the first and second gaming sessions with the credits won by each player in his or her respective gaming session being tracked in the first and second credit meters respectively. When the first and second gaming sessions terminate, the winning player receives not only the credit amount in his or her respective credit meter but also in the losing player's credit meter.

In some embodiments, a portion of the credit amount balance in each of the first and second credit meters or in the joint credit meter is restricted from gameplay use and transferable only upon termination of the first and second gaming sessions. In other words, the restricted portion(s) of the credit amount(s) is unavailable for wagering in either gaming session by either player so as to preserve the restricted portion(s) of the credit amount(s) as an award to the winning player. This preserves at least a minimum award level for the winning player.

To enable a hosted EGM to track gaining activities of the different players in concurrent multi-player gaming sessions, the EGM can provide gaming information to the host server in electronic messages comprising the unique identifier of the EGM, the unique identifier of the player associated with the gaming information or activity, and a description of the gaming information or activity. By waxy of illustration, the host server receives, from the EGM at a first time and through a network communications interface, a first electronic message comprising an identifier of the EGM, a first identifier of the first player in a first gaming session, and a first description of a first gaming activity of the first player in the first gaming session; updates a first electronic record associated with the first gaming session to reflect the first gaming activity; receives, from the EGM and through the network communications interface, a second electronic message comprising the EGM identifier, a second identifier of the second player in a second gaming session, and a second description of a second gaming activity of the second player in the gaming session; updates a second electronic record associated with the second gaming session to reflect the second gaming activity; at a conclusion of the first and second gaming sessions, receives a third electronic message comprising the EGM identifier, one of the first and second player identifiers associated with a winning player, and a third description of a third gaming activity, the third description indicating an award to be transferred to the winning player; and updates a third electronic record of the winning player to reflect transfer of the award.

While the above embodiments are discussed with reference to first and second players and first and second credit meters, it is to be appreciated that the present disclosure is not limited to only two players or two player credit meters but can apply to any number of players and any number of player credit meters, the credit amounts of which are tracked by the joint credit meter.

While the various example embodiments of the present disclosure are discussed with reference to an EGM, it should be appreciated that the electronic gaming device can be not only other types of EGMs such as EGTs, virtual gaming machines, or VGMs but also with other electronic gaming devices such as kiosks and mobile devices.

While the various example embodiments of the present disclosure are discussed with reference to specific types of games it is to be appreciated that the teachings of the present disclosure can be employed with any number of different ty pes of electronic games and are therefore game type agnostic.

The multi-player tournament feature can be implemented within a casino, via a gaming network, online, and/or via mobile or smartphone application.

The feature can provide higher levels of player satisfaction and encourage higher levels of gameplay by enabling players to configure and participate in customized tournaments.

The technical problem of tracking of multiple players playing simultaneously on a common electronic gaming device can be accomplished by the technical solution of using login (e.g., card-in or mobile device login such as using Cardless Connect™ by IGT) and logout (e.g., card-out or mobile device logout) events of a given player.

The technical problem of tracking separate player activities and associating game activities or events with a specific one of the players on a common gaming device can be solved by including in electronic messages exchanged with a host server not only the unique gaming device identifier and gaming activity or event description but also the unique player identifier of the player associated with the gaming activity or event.

The technical problem of how to manage player credit balances on a common gaming device can be solved by using separate credit meters, each associated with a corresponding unique player identifier, and a joint credit meter to track consolidated gaming activities of the players or net credit adjustments of the players in respective concurrent gaming sessions.

The technical problem of how to manage more than one player playing simultaneous or concurrently active gaming sessions on a common gaming device can be solved by enabling the gaming device to operate in different discrete gaming modes, each gaming mode being associated with a different one of the players, such that when the gaming device operates in a first gaming mode, the first player is deemed to be playing in a first gaming session and when the gaming device operates in a second gaming mode, the second player is deemed to be playing in a second gaming session, with the gaming sessions being active during a common period of time.

Machine-to-machine communications and player input can be improved using an interactive service window on a host gaming device such as the gaming server 316, the service window having an address on the gaming or communications network different from an address of the host gaming device itself, to exchange directly in bound and out bound electronic messages with the remote gaming server 316 and display content provided by the gaming server 316 to the player. The service window can slide into view either from the right, left, or top of the gaming display and offer interactive touch screen capabilities to the player. The content of the game theme on the display is unaffected or independent of the service window, which can be opened or closed by the player. The service window can be a fully interactive touch screen menu that players can use to activate bonus features, view messages or advertisements from the casino, play side games such as the incentivization feature, and manage a player account. The service window can enable the operator of the gaming system to embed the application for the competitive gaming feature into their home website.

As discussed below, network speed and management and memory management can also be improved using not only the machine-to-machine communications but also the data structures employed for the concurrent gaming sessions on the common gaming device.

Figure 1B:
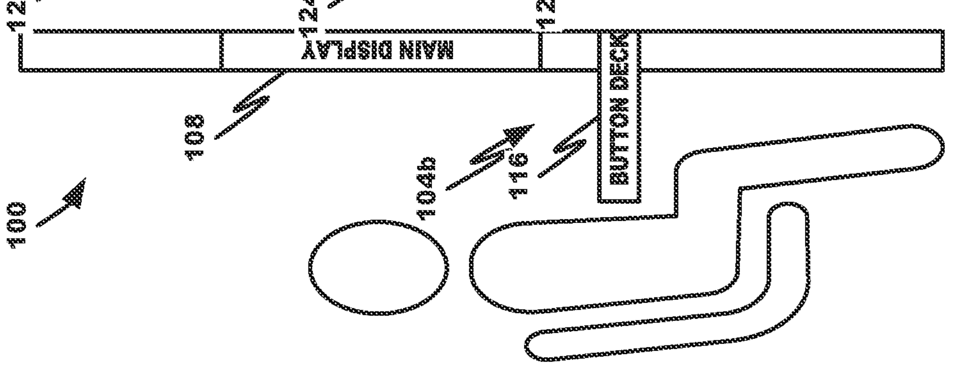
FIG. 1B depicts a side view of the gaming device of FIG. 1A.
Figure 1A:
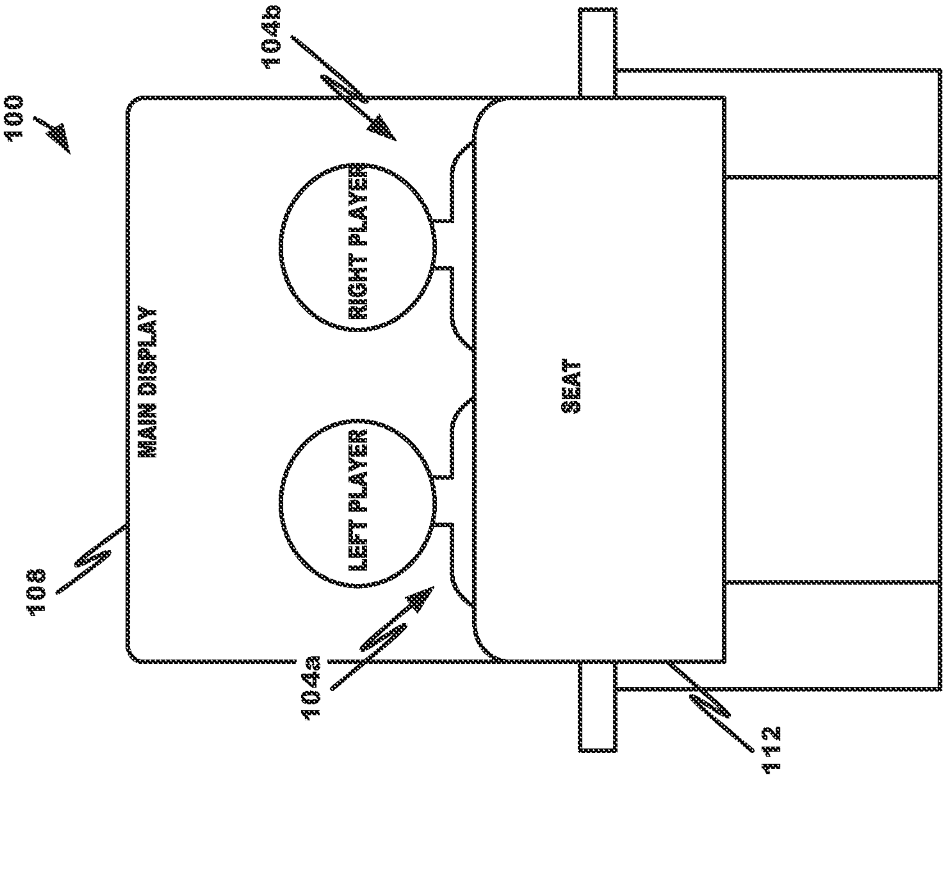
FIG. 1A depicts a front view of a multi-player gaming device in accordance with embodiments of the present disclosure.

With reference initially to FIGS. 1A-C, an electronic gaming device according to embodiments of the present disclosure is depicted. The electronic gaming device can be in the form of an EGM, EGT, VGM, video lottery terminal ("VLT"), kiosk, sports betting terminal, or other electronic gaming device. The electronic gaming device 100 comprises first and second player stations 104*a,b* for first and second players and a main display 108. Each player station 104 comprises a seat 112 and a button deck 116 to receive player input.

With reference to FIG. 1C, different button deck 116 configurations are depicted. In a first button deck configuration 120*a*, the button deck 116 comprises a left spin button 124*a* for the first player, a right spin button 124*b* for the second player, and a shared liquid crystal display or touchscreen 128 to receive input from and provide output to the first and second players. Either the left or right spin buttons, when pressed by a player, cause a reel to spin. In a second button deck configuration 120*b*, the button deck 116 comprises the left spin button 124*a* for the first player and the right spin button 124*b* for the second player but not a shared liquid crystal display to receive input from and provide output to the first and second players. In a third button deck configuration 120*c*, the button deck 116 comprises the left spin button 124*a* for the first player and the right spin button 124*b* for the second player. Instead of the shared liquid crystal display, the button deck 116 comprises plural buttons 132*a-c* to place wagers in different amounts. to receive input from and provide output to the first and second players. As will be appreciated, the button deck can have two sets of buttons 132*a-c* (one for each player) especially if the two players play different games. If they are required to play the same game, the button deck can have only one set of buttons to be shared by the players.

Figure 2:
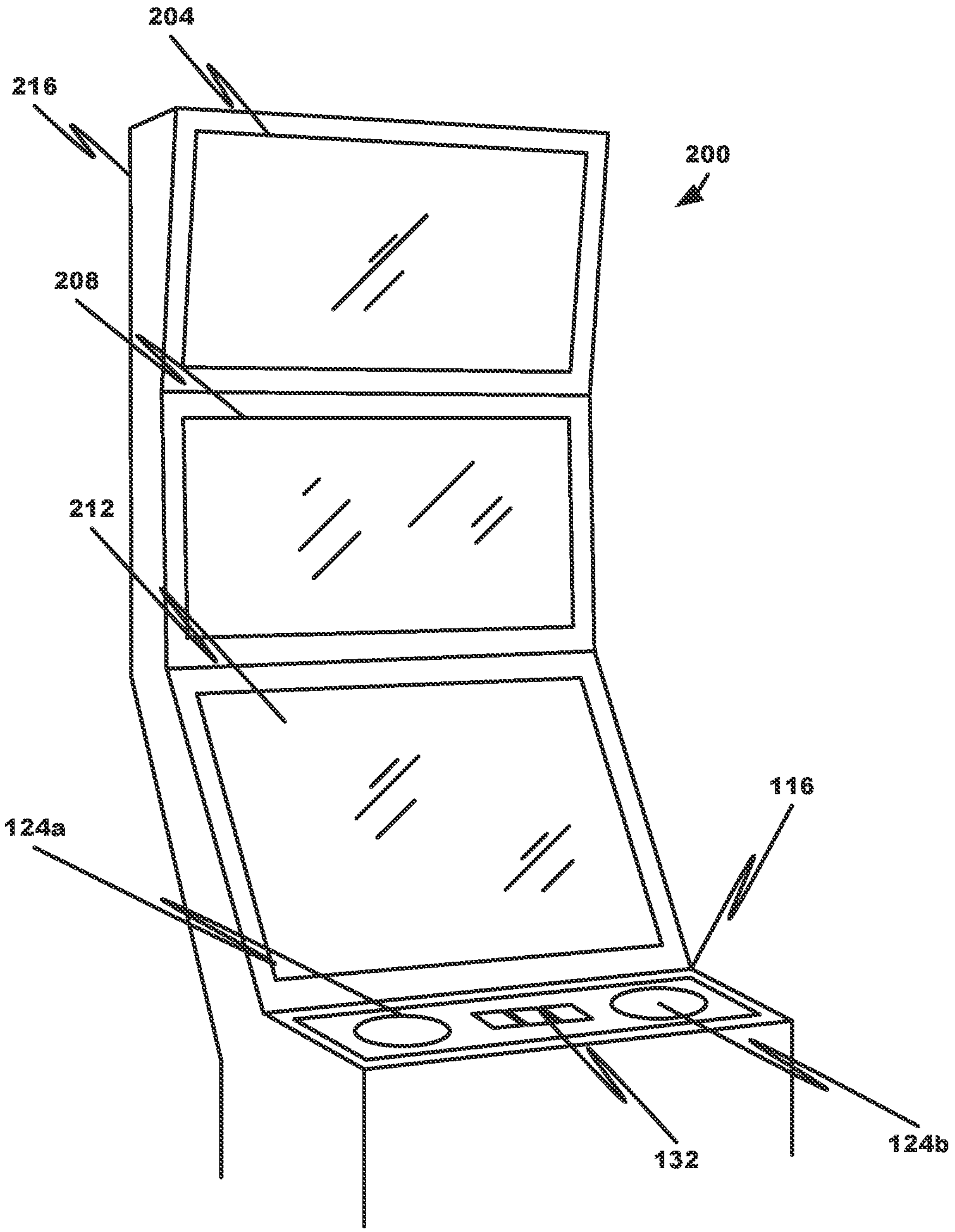
FIG. 2 depicts an isometric view of a multi-player gaming device in accordance with embodiments of the present disclosure.

With reference to FIG. 2, an electronic gaming device 200 according to another embodiment is depicted. The device 200 comprises first and second player stations comprising a button deck 116 having the button deck configuration 120*c*. The device 200 comprises first, second, and third displays 204, 208, and 212 to display gaming information, such as gaming activities and events. In one configuration, one of the first, second, and third displays 204, 208, and 212 is a service window that interacts directly with a host server (discussed below). The various components as well as other hardware, such as the microprocessor and computer readable memory, are contained in a common housing or cabinet or console 216.

Figure 3:
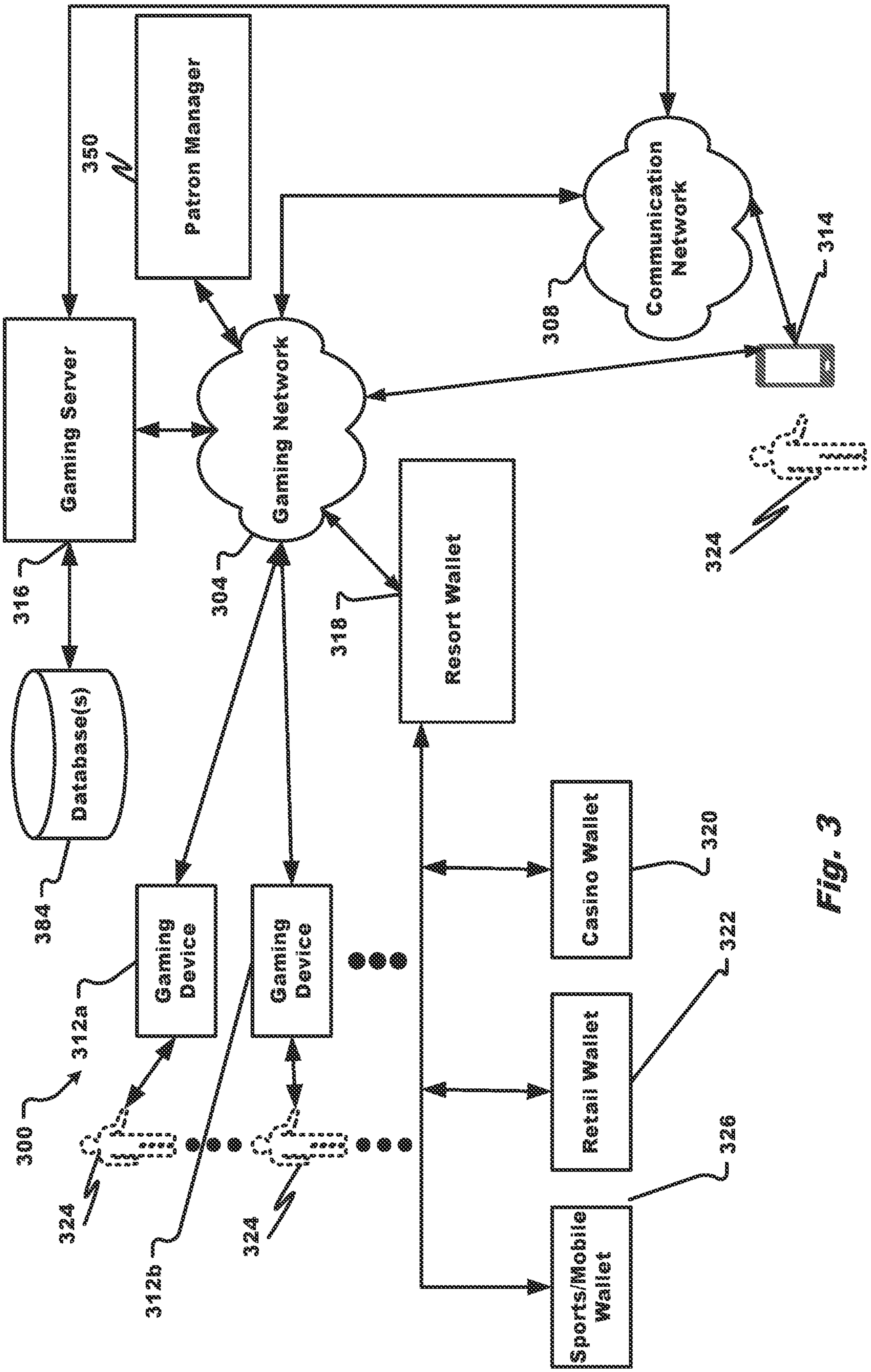
FIG. 3 is a block diagram of a gaming network in accordance with embodiments of the present disclosure.

Referring now to FIG. 3, details of an illustrative gaming system 300 will be described in accordance with at least some embodiments of the present disclosure. The components of the gaming system 300, while depicted as having particular instruction sets and devices, is not necessarily limited to the examples depicted herein. Rather, a network according to embodiments of the present disclosure may include one, some, or all of the components depicted in the system 300 and does not necessarily have to include all of the components. For instance, the components may be distributed amongst a plurality of servers and/or gaming devices (e.g., an EGM, etc.) without departing from the scope of the present disclosure. The illustration of a single central gaming server 316 is for ease of discussion and should not be construed as limiting embodiments of the present disclosure to a single-server architecture.

The gaming system 300 is shown to include a gaming network 304 and a communication network 308. The gaming network 304 may correspond to a distributed set of devices that interconnect and facilitate machine-to-machine communications between one or multiple gaming devices 312*a, b*, . . . (such as the electronic gaming device 100 or 200), each interacting with multiple players 324*a, b*, . . . , a mobile device 314 interacting with a player 324, a resort wallet 318 and associated casino wallet 320, retail wallet 322, and sports/mobile wallet 326, patron manager 350, and the gaming server 316.

The communication network 308 may correspond to a distributed set of devices that interconnect and facilitate machine-to-machine communications between the components of the gaming system 300 and external components including the mobile device 314. In some embodiments, the gaming network 304 and communication network 308 may correspond to different networks administered and/or maintained by different entities. In such a scenario, one or more of a gateway, firewall, or similar network border device may reside between the gaming network 304 and the communication network 308 (e.g., to maintain security preferences/settings of each network). In another possible scenario, the gaming network 304 and communication network 308 may correspond to the same or similar network. As a non-limiting example of the second scenario, the gaming network 304 and communication network 308 may both correspond to a distributed Internet Protocol (IP)-based communication network, such as the Internet.

The gaming network 304 and communication network 308 may include any type of known communication medium or collection of communication media and may use any type of protocols to transport messages between devices. As some non-limiting examples, the gaming network 304 may correspond to a WAN or LAN in which the plurality of gaming devices 312*a, b*, . . . are configured to communicate with the gaming server 316 using devices that are owned and administered by the same entity that administers security settings of the gaming devices 312*a, b*, . . . . As such, the gaming network 304 may be considered a secure or trusted network.

The communication network 308, in some embodiments, may also include a WAN or LAN. Alternatively or additionally, the communication network 308 may include one or more devices that are not administered by the same entity administering the gaming devices 312*a, b*, . . . . Thus, the communication network 308 may be considered an untrusted or unsecure network from the perspective of the gaming network 304. The Internet is an example of the communication network 308 that constitutes an IP network consisting of many computers, computing networks, and other communication devices located all over the world, which are connected through many telephone systems and other means. Other examples of the communication network 308 include, without limitation, a standard Plain Old Telephone System (POTS), an Integrated Services Digital Network (ISDN), the Public Switched Telephone Network (PSTN), a cellular network, and any other type of packet-switched or circuit-switched network known in the art. In some embodiments, the communication network 308 may be administered by a Mobile Network Operator (MNO) whereas a casino entity may administer the gaming network 304.

It should be appreciated that the gaming network 304 and/or communication network 308 need not be limited to any one network type, and instead may be comprised of a number of different networks and/or network types. Moreover, the gaming network 304 and/or communication network 308 may comprise a number of different communication media such as coaxial cable, copper cable/wire, fiberoptic cable, antennas for transmitting/receiving wireless messages, wireless access points, routers, and combinations thereof.

In some embodiments, the gaming devices 312*a, b*, . . . may be distributed throughout a single property or premises (e.g., a single casino floor) or the gaming devices 312*a, b*, . . . may be distributed among a plurality of different properties. In a situation where the gaming devices 312 *a, b*, . . . are distributed in a single property or premises, the gaming network 304 may include at least some wired connections between network nodes (e.g., a LAN or multiple LANs). As a non-limiting example, the nodes of the gaming network 304 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 312 *a, b*, . . . may utilize the same or different types of communication protocols to connect with the gaming network 304. It should also be appreciated that the gaming devices 312 *a, b*, . . . may or may not present the same type or category of game to a player 324. It should be appreciated that a gaming device 312 *a, b*, . . . may correspond to one example of a gaming device. It should also be appreciated that the functions and features described in connection with a gaming device 312 *a, b*, . . . may be provided in any other type of gaming device without departing from the scope of the present disclosure.

In some embodiments, the gaming devices 312 *a, b*, . . . may be configured to communicate with a centralized management server in the form of the central gaming server 316. The central gaming server 316 may be configured to centrally manage games of chance, games of skill, or hybrid games of chance/skill played at the gaming devices 312 *a, b*, . . . (e.g., slot games), enable execution of a different game (e.g., a card game), monitor player 324 activity at the gaming devices 312 *a, b*, . . . , track player 324 association with a gaming device 312 (such as loyalty point initiation events and other gaming events), facilitate communications with players 324 via the gaming devices 312 *a, b*, . . . , and/or perform any other task in connection with games played by a player 324 at gaming devices.

It should be appreciated that the central gaming server 316 may or may not be co-located with the gaming devices 312. Thus, one or more gaming systems 312 may communicate with the gaming server 316 over a WAN, such as the Internet. In such an event, a tunneling protocol or Virtual Private Network may be established over some of the communication network 308 to ensure that communications between a gaming device 312 and a remotely-located gaming server 316 are secured.

FIG. 3 also depicts the possibility of some personal gaming mobile devices 314 (e.g., smart phones, tablet computers, etc.) being paired with a gaming device 312, thereby enabling communications to flow between the personal gaming mobile device on the one hand and the gaming device 312 on the other. This communication may utilize a proximity-based communication protocol, such as Bluetooth, BLE, NFC, WiFi, etc. One or more personal gaming devices of the player 324 may not necessarily be paired with a gaming device 312, but such personal gaming devices may still be configured to communicate with the central gaming server 316 via the communication network 308. Communications between the gaming device 312 and personal gaming mobile device may facilitate any number of combinations of gameplay opportunities.

The central gaming server 316 is in communication, via the gaming network 304, with one or more databases 384. The databases 384 may be configured to store one or multiple data structures (which can include the resort wallet 318, casino wallet 320, retail wallet 322, and sports/mobile wallet 326 and gaming session information) that are used in connection with interactive gaming activities of players 324 and the gaming system 300. The databases can use any database model and compatible database management system. Examples of database models include relational databases, object-oriented databases, and non-relational databases, such as NoSQL and NewSQL databases.

In various embodiments, a gaming establishment fund management function in the gaming server 316 that includes one or more cashless wagering systems that are each associated with or otherwise maintain one or more cashless wagering accounts. In certain embodiments, the gaming establishment fund management function includes a first cashless wagering system that maintains a first cashless wagering account, in which a player utilizes a mobile device application or app running on a mobile device to facilitate the electronic transfer of any funds between the first cashless wagering account and a gaming device 312. For example, as seen in FIG. 1, a resort wallet 318 or enterprise wallet includes or is otherwise in communication with a sports/mobile wallet 326 (i.e., a first cashless wagering account maintained by a first cashless wagering function) accessible via the mobile device 314 running a mobile device application as described herein.

In certain embodiments, the gaming establishment fund management system additionally or alternatively includes a second cashless wagering function that maintains a second cashless wagering account associated with a physical instrument, such as a player issued magnetic striped card. In these embodiments, a player utilizes the physical instrument (e.g., via inserting the card into a player tracking unit associated with a gaming device) to facilitate the electronic transfer of any funds between this second cashless wagering account and the gaming device. Continuing with the example, as seen in FIG. 3, the resort or enterprise wallet 318 also includes or is otherwise in communication with a casino wallet 320 (i.e., a second cashless wagering account maintained by a second cashless wagering function) accessible via a physical instrument, such as a player issued magnetic striped card associated with the second cashless wagering function or a mobile device 314 associated with the second cashless wagering function.

In various embodiments, in addition to or an alternative of maintaining one or more cashless wagering accounts via one or more cashless wagering functions, the gaming establishment fund management function includes one or more gaming establishment retail functions that each maintain one or more gaming establishment retail accounts. Such a gaming establishment retail account (i.e., a gaming establishment retail wallet 322) integrates with various retail point-of-sale systems throughout the gaming establishment to enable players to purchase goods and/or services via the player's gaming establishment retail account. Continuing with this example, as seen in FIG. 3, the resort or enterprise wallet 318 further includes or is otherwise in communication with the retail wallet 322 (i.e., a gaming establishment retail account maintained by a gaming establishment retail function) accessible via a point-of-sale terminal associated with a gaming establishment.

The gaming system 300 can include a patron manager 350 that manages the award of loyalty points and balance of players' loyalty points accounts. Typically, the patron manager 350 monitors gaming events of players on gaming devices 312*a, b*, . . . and changes in the balance of the resort wallet 318, casino wallet 320, retail wallet 322, and sports/mobile wallet 326, and other player transactions with the gaming establishing or casino and, applying promotional rules, increments or decrements a player's loyalty point balance in the resort wallet 318. In some embodiments, the patron manager owns the loyalty point balance. The loyalty point balance is not stored in the resort wallet 322.

The gaming system 300 can receive communications from the patron manager 350 to determine gaming and other activities of each player 324 having an account with the gaming system 300, whether or not the player 324 is currently engaged with, or logged into, the gaming system 300. Player activities can take many forms including one or more of gaming events of players on gaming devices 312*a, b*, . . . (including game outcomes, credit meter or wager credit balances, and the like) and changes in the balance of the resort wallet 318, casino wallet 320, retail wallet 322, and/or sports/mobile wallet 326, and other player transactions with the gaming establishing or casino.

Figure 4:
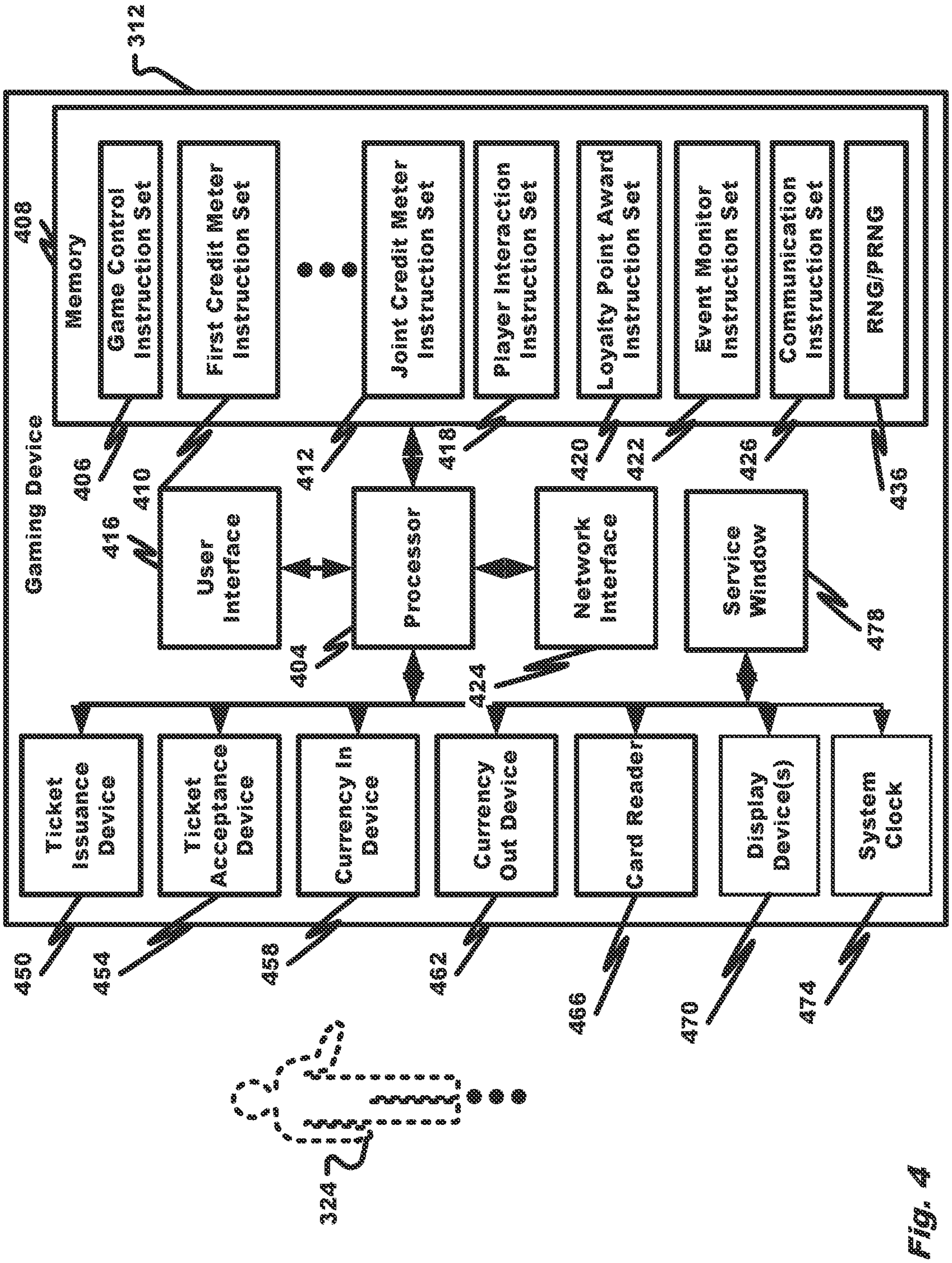
FIG. 4 is a block diagram depicting a gaming device in accordance with embodiments of the present disclosure.

With reference to FIG. 4, additional details of the components that may be included in a gaming device 312 will be described in accordance with at least some embodiments of the present disclosure.

A gaming device 312 may correspond to a portable or non-portable device used for executing a gaming application or multiple different gaming applications without departing from the scope of the present disclosure. Non-limiting examples of a gaming device 312 include an EGM, a VGM, EGT, EGT player station, VR gaming machine, AR gaming machine, VLT, a mobile communication device (e.g., a smartphone, laptop, wearable device, etc.), a laptop, a PC, etc. The illustrative gaming device 312 depicted in FIGS. 1 and 2 may include a support structure, housing or cabinet, which provides support for a plurality of displays, inputs, controls and other features of a conventional gaming machine. In some embodiments, first and second players 324 plays gaming device 312 while sitting, however, the gaming device 312 is alternatively configured so that a player can operate it while standing, moving, or sitting. The illustrated gaming device 312 can be positioned on the floor but can be positioned alternatively (i) on a base or stand, (ii) as a pub-style table-top game, (iii) as a stand-alone computational device on the floor of a casino with other stand-alone computational devices, or (iv) in any other suitable manner. The gaming device 312 can be constructed with varying cabinet and display configurations.

The gaming device 312 is shown to include a processor 404, memory 408, a network interface 424, and a user interface 416.

In some embodiments, the processor 404 may correspond to one or many microprocessors, CPUs, microcontrollers, Integrated Circuit (IC) chips, or the like. For instance, the processor 404 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 404 may be provided as a microcontroller, microprocessor, Central Processing Unit (CPU), or plurality of microprocessors that are configured to execute the instructions sets stored in memory 408. In some embodiments, the instruction sets stored in memory 408, when executed by the processor 404, may enable the gaming device 312 to provide game play functionality.

The nature of the network interface 424 may depend upon whether the network interface 424 is provided in cabinet- or player station-style gaming device 312 or a mobile gaming device 312. Examples of a suitable network interface 424 include, without limitation, an Ethernet port, a USB port, an RS-232 port, an RS-485 port, a NIC, an antenna, a driver circuit, a modulator/demodulator, etc. The network interface 424 may include one or multiple different network interfaces depending upon whether the gaming device 312 is connecting to a single gaming network 304 or multiple different types of gaming networks 304. For instance, the gaming device 312 may be provided with both a wired and wireless network interface 424 without departing from the scope of the present disclosure.

The user interface 416 may include a combination of user input devices and user output devices. For instance, the user interface 416 may include a display screen, speakers, buttons, levers, a touch-sensitive display, or any other device that is capable of enabling player 324 interaction with the gaming device 312. Specific examples of the user interface 416 include the various button deck 116 configurations 120*a-c* discussed above. The user interface 416 may also include one or more drivers for the various hardware components that enable player 324 interaction with the gaming device 312.

The memory 408 may include one or multiple computer memory devices that are volatile or non-volatile. The memory 408 may include volatile and/or non-volatile memory devices. Non-limiting examples of memory 408 include Random Access Memory (RAM), Read Only Memory (ROM), flash memory, Electronically-Erasable Programmable ROM (EEPROM), Dynamic RAM (DRAM), etc.

The memory 408 may be configured to store the instruction sets depicted in addition to temporarily storing data for the processor 404 to execute various types of routines or functions. The instruction sets can enable user interaction with the gaming device 312 and game play at the gaming device 312. Examples of instruction sets that may be stored in the memory 408 include a game control instruction set 406, first, . . . credit meter instruction sets 410, joint credit meter instruction set 412, player interaction instruction set 412, loyalty point award instruction set 418, event monitor instruction set 422, communication instruction set 426, and random number generator or pseudorandom number generator (collectively referenced as PRNG/RNG) 436 that is used by the game control instruction set 406, for example, to provide game outputs.

In some embodiments, the game control instruction set 406, when executed by the processor 404, may enable the gaming device 312 to facilitate one or more games with the player(s) 324. In some embodiments, the game control instruction set 464 may include subroutines that receive electronic messages from player(s) and others comprising an indication of consideration (e.g., a wager, mini wager, side wager, etc.) for occurrence of a predicted level of player performance in the game, subroutines that stream a video of the game to gaming and personal gaming devices 312, 314 of other non-players or third parties, subroutines that create, maintain and update player profiles of the player(s) to the game, subroutines that generate, such as by PRNG/RNG 436, an outcome of the game, subroutines that alter, modify, or select game or display operations or functions in response to the gaming sessions, subroutines that calculate whether an outcome of the game has resulted in a win or loss during the game, subroutines for determining winnings and award payouts for the player(s) and others in the event of a win, subroutines for exchanging communications with another device, such as another gaming device 312 or gaming server 316, and any other subroutine useful in connection with facilitating game play at the gaming device 312.

In one example, the game control instruction set 406, when executed by the processor 404, enable the gaming device 312 to receive a request to initiate concurrent first and second gaming sessions with the first and second players, initiate the concurrent first and second gaming sessions, upon occurrence of a gaming event, terminate the first and second gaming sessions, compare a first credit amount of the first player with a second credit amount of the second player, and based on comparison of the first and second credit amounts, update an electronic record associated with one of the first and second players to reflect transfer of an award to the winning one of the first and second players from a losing one of the first and second players.

The first credit meter instruction set, . . . 410, when executed by the processor 404, may enable the gaming device 312 to facilitate a tracking of activity at the gaming system 300 for reporting to the gaming server 316 or patron manager 350. In some embodiments, the first credit meter instruction set, . . . 210 may be used to store or log information related to various player 324 activities and events that occur at the gaming device 312. The types of information that may be maintained in the first credit meter instruction set, . . . 410 include, without limitation, player information, available credit information, wager amount information, changes in wager credit meter balance as a function of time, and other types of information that may or may not need to be recorded for purposes of accounting for wagers placed at the gaming device 312 and payouts made for a player 324 during a game of chance or skill played at the gaming device 312. In some embodiments, the first credit instruction set, . . . 410 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the gaming device 312, and the like. In some embodiments, certain portions of the first credit meter instruction set, . . . 410 may be updated in response to outcomes of a game of chance or skill played at the gaming device 312. In some embodiments, the gaming device 312 does not include a first credit meter instruction set, . . . 410.

In one example, the gaming device 312 simultaneously or concurrently interacts with multiple players, such as first and second players, each of which has a separate credit meter. In response to receiving first and second credit information associated with the first and second players, respectively, first and second credit meter instruction sets cause the processor to update first and second credit amounts for the first and second players, respectively. The first and second credit amounts are displayed, at the same or different times, on one or both of the display device 470 or service window 478.

The joint credit meter instruction set 412, when executed by the processor 404, may enable the gaming device 312 to facilitate a tracking of credit amounts of credit meters for multiple players 324 at the gaming device 312 and update a joint credit amount associated with the joint credit meter. By way of illustration, the joint credit amount can be derived from (e.g., be a mathematical sum of) the first and second credit amounts. In response to a change in one of the first and second credit amounts, the joint credit meter instruction set 412 causes the processor 404 to update an electronic record associated with the joint credit meter to reflect the change in the first and/or second credit amounts and simultaneously display on one or both of the display device 470 or service window 478, a changed joint credit amount in addition to one or both of a changed one of the first and second credit amounts and the other of the first and second credit amounts. The change in the credit information causing the change in the first and/or second credit amount can include: a first wager amount deducted from the first credit meter for a play of a first wagering game of the first electronic gaming machine, a second wager amount deducted from the second credit meter for a play of a second wagering game of the first electronic gaming machine, an amount added to the first credit meter from a play of the first wagering game, an amount added to the second credit meter from a play of the second wagering game, a cash-out of the first credit meter, a cash-out of the second credit meter, a first player deposit of a first amount of funds to the first credit meter, and/or a second player deposit of a second amount of funds to the second credit meter.

In some embodiments, the first credit meter instruction set, . . . 410 and/or joint meter instruction set 412 reserves a portion of the credit amount balance in each of the first and second credit meters and/or in the joint credit meter as an award to the winning player. In other words, the first credit meter instruction set, . . . 410 and/or joint meter instruction set 412 restricts the reserved credit amount(s) from game-play use during the gaming sessions and makes the reserved credit amount(s) transferable only upon termination of the first and second gaming sessions. In other words, the restricted portion(s) of the credit amount(s) is/are unavailable for wagering in either gaming session by either player so as to preserve the restricted portion(s) of the credit amount(s) as an award to the winning player. This preserves at least a minimum award level for the winning player.

The player interaction instruction set 418 and event monitor instruction set 422, when executed by the processor 404, detect player activity at the gaming device 312 and other gaming events and notify the gaming server 316 or patron manager 350 of an instance of detected player 324 interaction, a type of player 324 interaction detected, and a timestamp from a system clock 474 and associated with the player 324 interaction and enable the gaming device 312 to monitor operations of components of the gaming system 300 in response to interaction with players. Types of player interaction with the gaming device 312 can comprise, for example, physical contact of an input of the gaming device by a player 324, a gaming activity or event such as a game outcome, a change in a credit amount maintained by the first credit meter instruction set, . . . 410 associated with the gaming device 312, and the like.

To enable the gaming server to track the player activity and other gaming events, the player interaction instruction set 418 and event monitor instruction set 422, when executed by the processor 404, cause the processor 404 to forward, to the gaming server through the network communications interface, a first electronic message comprising a unique identifier of the gaming device, a first identifier of a first player in a gaming session, a first description of a first gaming activity of the first player in the gaming session, and a first timestamp associated with occurrence of the first gaming activity, update a first electronic record associated with the gaming session to reflect the first gaming activity, forward, to the gaming server through the network communications interface, a second electronic message comprising the device identifier, a second identifier of a second player in the gaming session, a second description of a second gaming activity of the second player in the gaming session, and a second timestamp associated with occurrence of the second gaming activity, update a second electronic record associated with the gaming session to reflect the second gaming activity, at a conclusion of the gaming session, receive a third electronic message comprising the gaming device identifier, one of the first and second identifiers associated with a winning player, a third description of a third gaming activity, and a third timestamp associated with occurrence of the third gaming activity, the third description indicating an award to be transferred to the winning player, and update a third electronic record of the winning player to reflect transfer of the award from a wallet of a losing one of the first and second players to a wallet of a winning one of the first and second players.

The loyalty point award instruction set 420, when executed by the processor 404, applies the promotional rules to the monitored operations to reward loyalty points to eligible players. The loyalty point award instruction set 420 further causes the processor 404 to increment and decrement loyalty point award balances for eligible players. As noted, these functions can also be performed by the patron manager 350 independently of the gaming device or as part of the gaming server 316 as discussed below.

The communication instruction set 426, when executed by the processor 404, may enable the gaming device 312 to communicate with the central gaming server 316 and/or a personal gaming device. In some embodiments, the communication instruction set 426 may include instructions that enable the gaming device 312 to pair with a personal gaming mobile device and establish a communication channel with the personal gaming mobile device via the pairing. As an example, the communication instruction set 426 may include instructions that enable NFC, Bluetooth®, Wi-Fi, or other types of communication protocols. It should be appreciated that the communication instruction set 426 may also be updated to reflect when a personal gaming mobile device is paired with the gaming device 312 and such pairing information may include addressing information for the personal gaming device and/or identification information associated with the player 324 of the personal gaming mobile device. Alternatively or additionally, the communication instruction set 426 may enable the gaming device 312 to identify a player 324 of the personal gaming device, identify a loyalty account associated with the player 324 of the personal gaming device, exchange information (e.g., send or receive) with a loyalty application operating on the personal gaming device, or combinations thereof. In some embodiments, the communication instruction set 426 may be configured to operate or drive the network interface 424 to facilitate direct or indirect communications with a personal gaming device.

While shown as separate instruction sets, it should be appreciated that any of the game control instruction set 406, first credit meter instruction set, . . . 410, joint credit meter instruction set 412, player interaction instruction set 418, loyalty point award instruction set 420, and event monitor instruction set 422 may correspond to a subroutine of the game control instruction set 206 without departing from the scope of the present disclosure.

The gaming device 312 is further shown to include a ticket issuance device 450, a ticket acceptance device 454, a currency in device 458, a currency out device 462, and a card reader 466. The ticket issuance device 450 may be configured to print physical tickets, vouchers, or the like. The ticket acceptance device 454 may be configured to receive, scan, and/or recognize information from an input physical ticket, voucher, or cash. In some embodiments, the ticket issuance device 450 and ticket acceptance device 454 may operate in concert with a common piece of hardware that both accepts and produces physical tickets, vouchers, or the like. Tickets or vouchers printed by ticket issuance device 450 and recognizable by the ticket acceptance device 454 may correspond to physical lottery tickets, casino vouchers, paper coupons, and the like. Alternatively or additionally, the ticket issuance device 450 and/or ticket acceptance device 454 may be connected to ticket or cash reading hardware. In such an embodiment, the ticket issuance device 450 and ticket acceptance device 454 may operate as a driver and/or firmware component for the card reader. In some embodiments, multiple players each have a different individual credit meter but use or share a common ticket that is printed by ticket issuance device 450 and recognizable by the ticket acceptance device 454. The players pass the common ticket back and forth as desired to perform player-specific transactions with the gaming device 312.

Similarly, the currency in device 458 and currency out device 462 may include or operate in concert with a coin slot or any other type of coin delivery mechanism. The currency in device 458 and currency out device 462 may include hardware, drivers, or firmware that facilitate receiving or distributing tokens, coins, chips, etc. In some embodiments, the currency in device 458 may be configured to determine an amount of coins (an amount of tokens, an amount of chips, etc.), input at the coin slot and convert the values into credits for playing games. The currency out device 462 may correspond to hardware and software configured to output coins, tokens, chips, etc. if a player decides to cash out or convert playing credits back into coins, tokens, or chips, etc.

The card reader 466 may include hardware and/or software configured to read or accept any type of card, or portable credential (e.g., NFC, Bluetooth, Wi-Fi, etc.). In some embodiments, the card reader 466 may include hardware and/or software that enable contactless reading of a card, token, or portable credential. In some embodiments, the card reader 466 may include hardware and/or software that enable contact-based reading of a card, token, or portable credential (e.g., magstripe, chip reader, electrodes, card-receiving slot, etc.). It should be appreciated that the card reader 466 may be configured to receive and reader a card or portable credential, token, in any type of format (e.g., portable plastic card, magstripe card, key fob, etc.). It should also be appreciated that the card reader 466 may be configured to write information or data onto a card or portable credential. Furthermore, in some embodiments, the card reader 466 may be configured to read a player loyalty card in the form of a plastic credit-card shaped credential. In some embodiments, the card reader 466 may enable communications with a loyalty application operating on a player's personal gaming device.

The gaming device 312 may include one or more display devices 470 configured to render information, live video, communications windows, wagering interface windows, games, interactive elements, and/or other visual output to one or more display screens. The gaming device 312 may include one or more display controllers configured to control an operation of the display device 470. This operation may include the control of input (e.g., player input via the user interface 416, command input via the instruction sets in memory 408, combinations thereof, etc.), output (e.g., display, rendered images, visual game behavior, etc.) and/or other functions of the display device 470.

In an embodiment, the display device 470 comprises one or more display screens that are configured to selectively activate pixels and/or display elements to render one or more games, windows, indicators, interactive elements, icons, characters, lights, images, etc. Non-limiting examples of the display screen may include, but are in no way limited to, a liquid crystal display (LCD), a light-emitting diode (LED) display, an electroluminescent display (ELD), an organic LED (OLED) display, and/or some other two-dimensional and/or three-dimensional display. In some embodiments, the one or more display screens may be separated into a main display and a secondary display.

In an embodiment, the display device 470 comprises one or more projectors to project virtual reality or augmented reality images during the escape room game. The projector (s) can be any projecting device that can project a computer image onto a projection augmented model (PA model) and/or a spatially augmented reality (SAR) model to provide the players 324 with augmented reality, augmented virtuality, and/or virtual reality computer-generated game environments. As will be appreciated, projection mapping, video mapping or SAR typically uses one or more optical devices or projectors that project a beam of light onto a selected escape room space to provide the player with the augmented reality, augmented virtuality, and/or virtual reality computer-generated game environments.

In an embodiment, the display device 470 comprises head-mounted displays worn by the players 324 to view the augmented reality, augmented virtuality, or virtual reality computer-generated game environments.

The display device 470 may include a display driver, a power supply, an input/output, and/or other components configured to enable operation of the display device 470. The display driver may receive commands and/or other data provided by the processor 404 and one or more of the instruction sets in memory 408. In response to receiving the commands, the display driver may be configured to generate the driving signals necessary to render the appropriate images to the display screen. The power supply may provide electric power to the components of the display device 470. In some embodiments, the power supply may include a transformer and/or other electronics that prevent overloading, condition power signals, and/or provide backup power to the display device 470. The input/output may correspond to one or more connections for receiving or exchanging information and/or video from components of the gaming device 312. The input/output may include an interconnection to the network interface 424. By way of non-limiting example, the input/output may include a high-definition multimedia interface (HDMI) input, Ethernet, composite video, component video, H.264, or other video connection.

The gaming device 312 can further include a system clock 474 for timestamp creation. The system clock 474 can be implemented in hardware (e.g., a quartz crystal oscillator) or software that generates and sends out a timing signal on a regular or periodic basis to all other computer components of the gaming device 312 to synchronize the various components operations. In some embodiments, the gaming device 312 comprises both a hardware clock known as the Real Time Clock and a software clock.

In some embodiments, the gaming device comprises a service window 478 that exchanges electronic messages with the gaming server 316 and controls one or more of the display device(s) 470.

In some embodiments, the gaming device uses a Slot Accounting System (SAS) protocol to provide automated gaming device meter reporting, real-time event logging, exception reporting, electronic and/or advanced (cashless) funds transfer, ticket in/ticket our functionality, multi-denomination accounting, gaming device configuration reporting, game accounting, and game bonusing and control progressives, among other functions.

Figure 5:
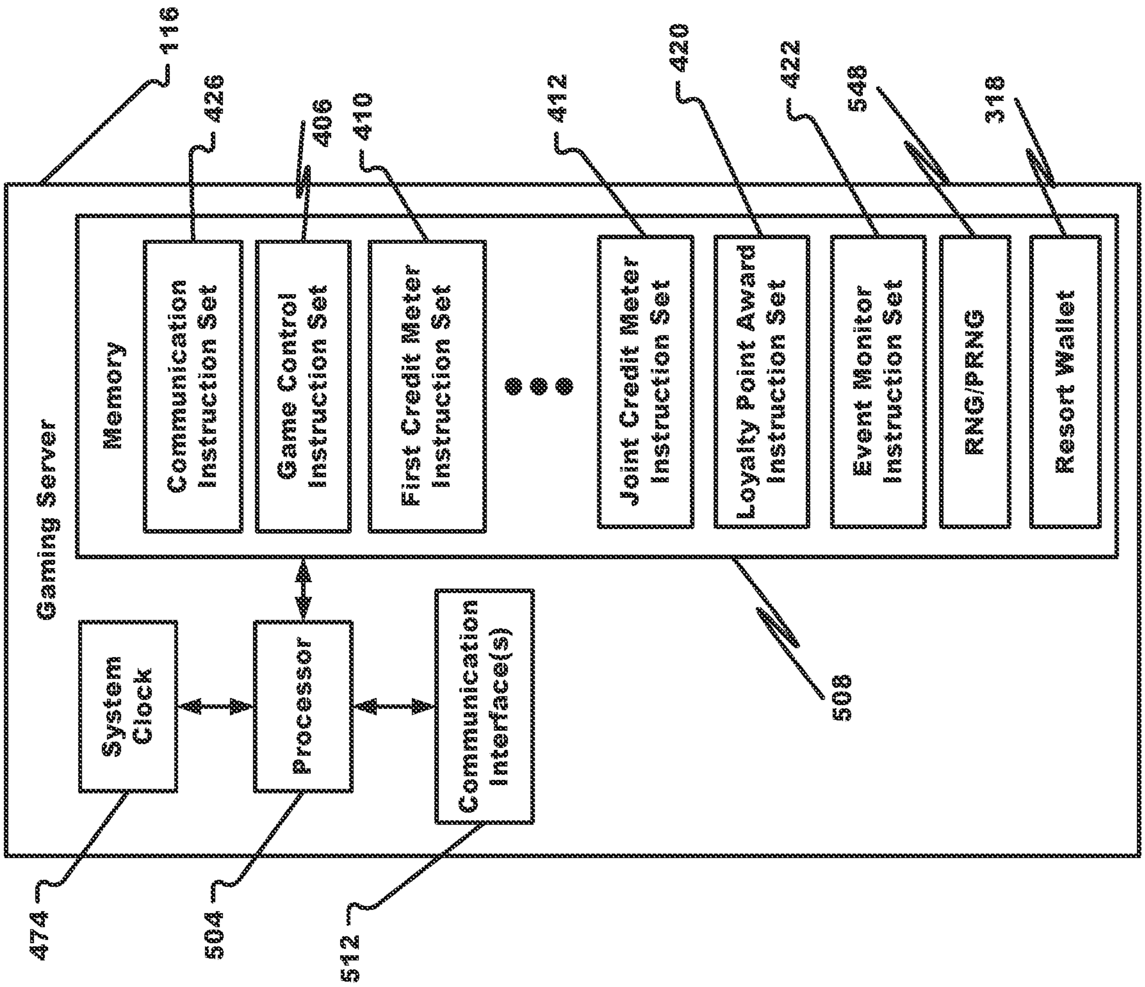
FIG. 5 is a block diagram depicting a gaming server in accordance with embodiments of the present disclosure.

With reference now to FIG. 5, additional details of a gaming server 316 will be described in accordance with embodiments of the present disclosure. The gaming server 316 is shown to include a processor 504, memory 508, and a plurality of communication interfaces 512. These resources may enable functionality of the gaming server 316 as will be described herein. For instance, a communication interface 512 may provide the gaming server 316 with the ability to send and receive communication packets or the like over the gaming network 304. The communication interface 512 can also facilitate communications with the mobile devices 314 via the communication network 308. The communication interface 512 may be provided as a network interface card (NIC), a network port, drivers for the same, and the like. Communications between the components of the gaming server 316 and other devices connected to the gaming network 304 may all flow through the communication interface 512.

The processor 504 may correspond to one or many computer processing devices. The processor 504 may be configured to execute one or more instruction sets stored in memory 508. Upon executing the instruction sets stored in memory 508, the processor 504 enables various authentication functions of the gaming server 316.

The memory 508 may include any type of computer memory device or collection of computer memory devices. The memory 508 may include volatile and/or non-volatile memory devices. Non-limiting examples of memory 508 include Random Access Memory (RAM), Read Only Memory (ROM), flash memory, Electronically-Erasable Programmable ROM (EEPROM), Dynamic RAM (DRAM), etc.

The illustrative instruction sets that may be stored in memory 508 include, without limitation, the communication instruction set 426, the game control instruction set 406, the first credit meter instruction set, . . . 410, the joint credit meter instruction set 412, the loyalty point award instruction set 420, and the event monitor instruction set 422, and resort wallet 318. Functions of the gaming server 316 enabled by these various instruction sets will be described in further detail herein. It should be appreciated that the instruction sets depicted in FIG. 5 may be combined (partially or completely) with other instruction sets or may be further separated into additional and different instruction sets, depending upon configuration preferences for the gaming server 316. Said another way, the particular instruction sets depicted in FIG. 5 should not be construed as limiting embodiments described herein. Although not depicted, the gaming server 316 may include instructions that enable a processor to store data into the database 384 and retrieve information from the database 384. Alternatively or additionally, the database 384 or data stored therein may be stored internal to the gaming server 316 (e.g., within the memory of the server 316 rather than in a separate database).

The random number generator or pseudorandom number generator (RNG/PRNG) 548, like the PRNG/RNG 436, is used to generate a random event as noted above. The RNG/PRNG 348 generates a distribution of numbers or game symbols (the random number value) that are not reasonably predictable by a random chance. Random number generators can be truly random hardware random generators (HRNGS), which generate random numbers as a function of current value of some physical environment attribute that is constantly changing in a manner that is practically impossible to model, or pseudo-random number generators (PRNGs), which generate numbers that look random, but are actually deterministic, and can be reproduced if the state of the PRNG were known. In some applications, the RNG/PRNG 548 uses computational algorithms that can produce long sequences of apparently random results, which are in fact determined by a shorter initial value, known as a seed value or key.

In one embodiment, the RNG/PRNG 548 is a PRNG, which constantly generates a sequence of simulated random numbers, at a rate of hundreds or perhaps thousands per second. As soon as a "play" button is pressed or other game initiation is received from the player or a predetermined event occurs, the most recent random number is used to determine the result. This means that the result varies depending on exactly when the game is played. In other embodiments, the RNG/PRNG 548 is a cryptographic random number generator.

In some embodiments, the resort wallet 318 comprises a cash wallet set of data structures that tracks a cash balance not only collectively for the gaming system 300 but also individually for each player's account managed by the gaming system 300. When cash is moved from a central resort wallet to a player's wallet, the appropriate data structures in each set of data structures are updated to reflect the transfer.

Figure 6:
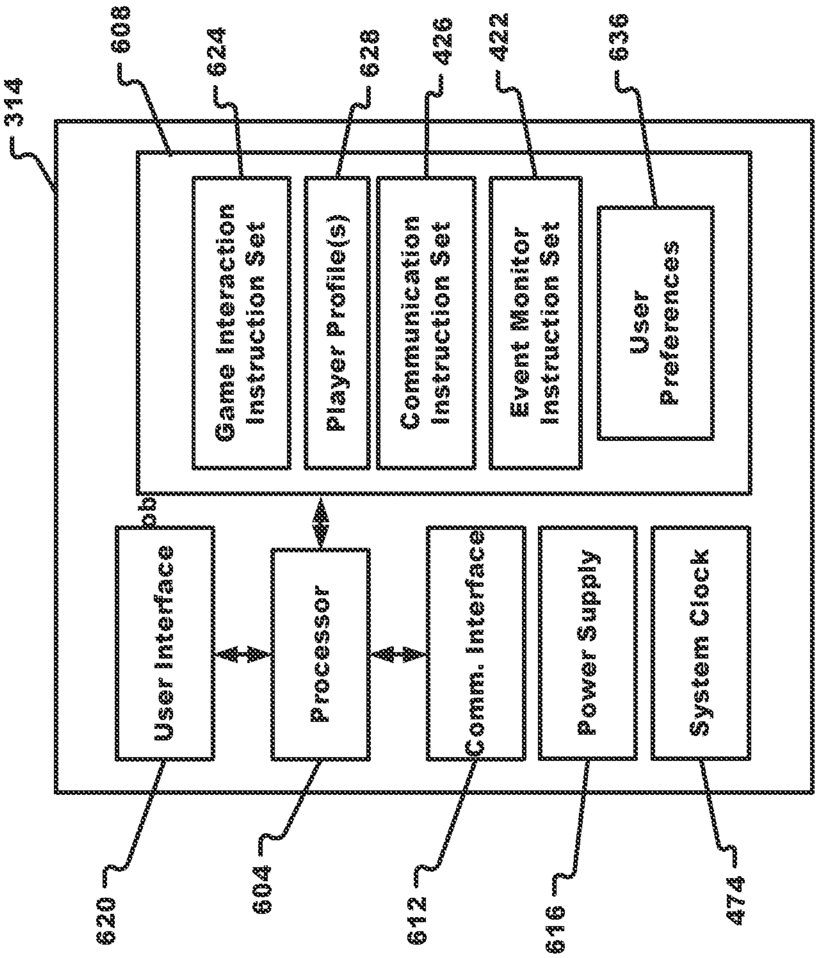
FIG. 6 is a block diagram depicting a mobile device in accordance with embodiments of the present disclosure.

With reference now to FIG. 6, additional details of the components that may be included in a mobile device 314 will be described in accordance with at least some embodiments of the present disclosure. The mobile device 314 includes a processor 604, memory 608, a communication interface 612, and a user interface 620. In some embodiments, the processor 604 may be similar or identical to any of the other processors 404, 504 depicted and described herein and may correspond to one or many microprocessors, CPUs, microcontrollers, Integrated Circuit (IC) chips, or the like. The processor 604 may be configured to execute one or more instruction sets stored in memory 608. In some embodiments, the instruction sets stored in memory 608, when executed by the processor 604, may enable the mobile device 314 to provide game play functionality, interact with gaming machines 312, pair with gaming machines 312, or any other type of desired functionality.

The communication interface 612 may be similar or identical to the network interface 424 and/or communication interfaces 512 depicted and described herein. The nature of the communication interface 612 may depend upon the type of communication network 308 for which the mobile device 314 is configured. Examples of a suitable communication interfaces 612 include, without limitation, a WiFi antenna and driver circuit, a Bluetooth antenna and driver circuit, a cellular communication antenna and driver circuit, a modulator/demodulator, etc. The communication interface 612 may include one or multiple different network interfaces depending upon whether the mobile device 314 is connecting to a single communication network 308 or multiple different types of communication networks. For instance, the mobile device 314 may be provided with both a wired communication interface 612 and a wireless communication interface 612 without departing from the scope of the present disclosure.

The user interface 620 may include a combination of a user input and user output device. For instance, the user interface 620 may include a display device, a microphone, a speaker, a haptic feedback device, a light, a touch-sensitive display, a button, or a combination thereof. The user interface 620 may also include one or more drivers for the various hardware components that enable user interaction with the mobile device 314.

The memory 608 may be similar or identical to other memory 408, 508 depicted and described herein and may include one or multiple computer memory devices that are volatile or non-volatile. The memory 608 may be configured to store instruction sets that enable player interaction with the mobile device 314 and that enable game play at the mobile device 314. Examples of instruction sets that may be stored in the memory 608 include a game interaction instruction set 624, player profile(s) 628, event monitor instruction set 422, user preferences 636, and a communication instruction set 426. In addition to the instruction sets, the memory 608 may also be configured to store data that is useable by the various instruction sets.

In some embodiments, the game interaction instruction set 624, when executed by the processor 604, may enable the mobile device 314 to facilitate one or more games of chance or skill and management of one or more player engagement indicator sets.

The player profile(s) 628 include a variety of player-specific data structures including player identification and login credentials.

The communication instruction set 632, when executed by the processor 604, may enable the mobile device 314 to communicate via the communication network 308. In some embodiments, the communication instruction set 426 may be similar or identical to the communication instruction set 432 and may be particular to the type of communication network 308 used by the mobile device 314. As an example, the communication instruction set 426 may be configured to enable cellular, WiFi, and/or Bluetooth communications with other devices. The communication instruction set 426 may follow predefined communication protocols and, in some embodiments, may enable the mobile device 314 to remain paired with a gaming device 312 as long as the mobile device 314 is within a predetermined proximity (e.g., 20-30 feet, an NFC communication range, or a Bluetooth communication range) and paired with the gaming device 312.

In some embodiments, the communication instruction set 426 enables a mobile device application of the mobile device to negotiate a secure, authenticated connection with the proper functionality, versions and security settings. This can be done using any of the authentication methods discussed below to effect cardless authentication. In other embodiments, player card-based authentication using the card reader 466 of the gaming device 312. In either case, the gaming device can alternate between each player of the multi-gaming session to authenticate independently and discretely authenticate each player before configuring the tournament session.

The user preferences 636 may correspond to gaming or wager or player engagement indicator preferences that are desired by the player 324 of the mobile device 314. In some embodiments, the user preferences 636 may comprise gameplay preferences used to select and configure a competitive gaming session against another player.

The mobile device 314 is also shown to include a power supply 616. The power supply 616 may correspond to an internal power supply that provides AC and/or DC power to components of the mobile device 314. In some embodiments, the power supply 616 may correspond to one or multiple batteries. Alternatively or additionally, the power supply 616 may include a power adapter that converts AC power into DC power for direct application to components of the mobile device 314, for charging a battery, for charging a capacitor, or a combination thereof.

Figure 7A:
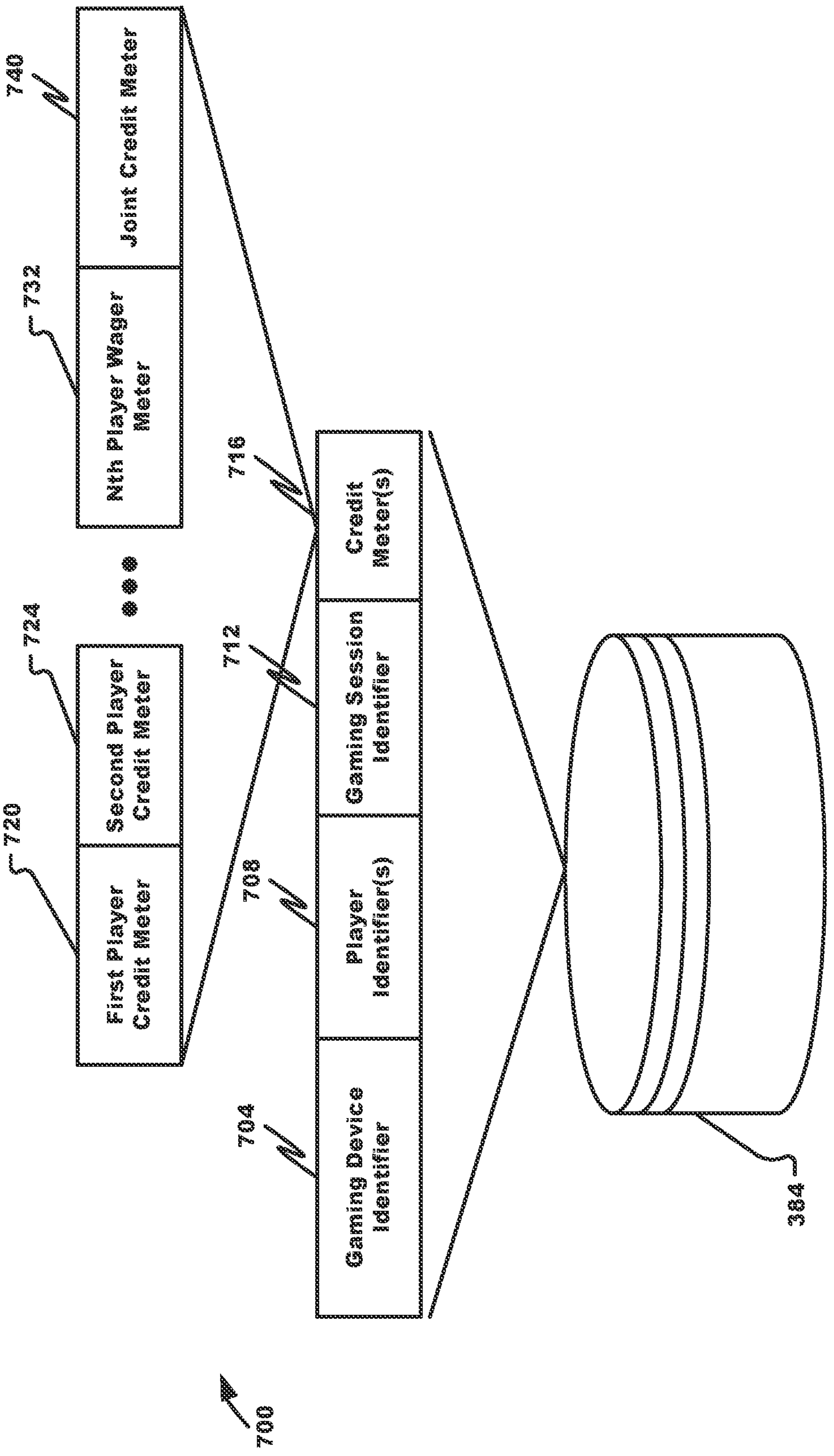
FIG. 7A is an illustrative data structure used in a player incentive award feature in accordance with embodiments of the present disclosure.
Figure 7B:
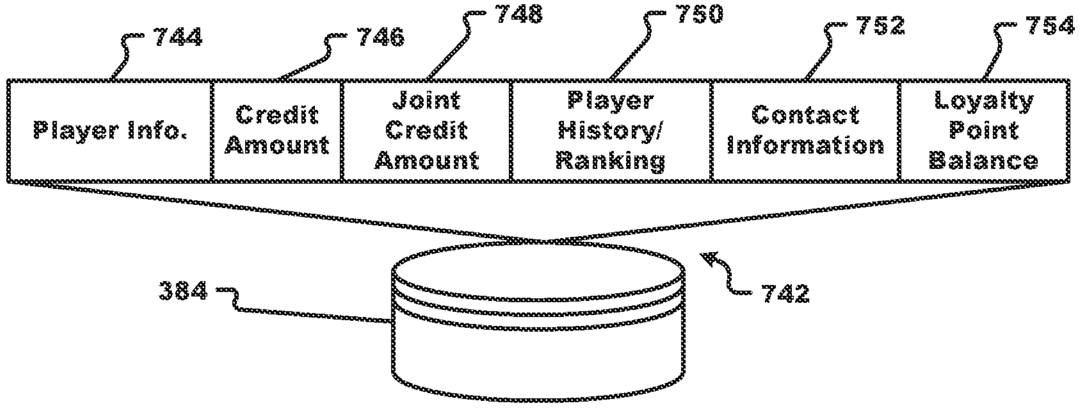
FIG. 7B is an illustrative data structure used in a player profile in accordance with embodiments of the present disclosure.
Figure 7C:
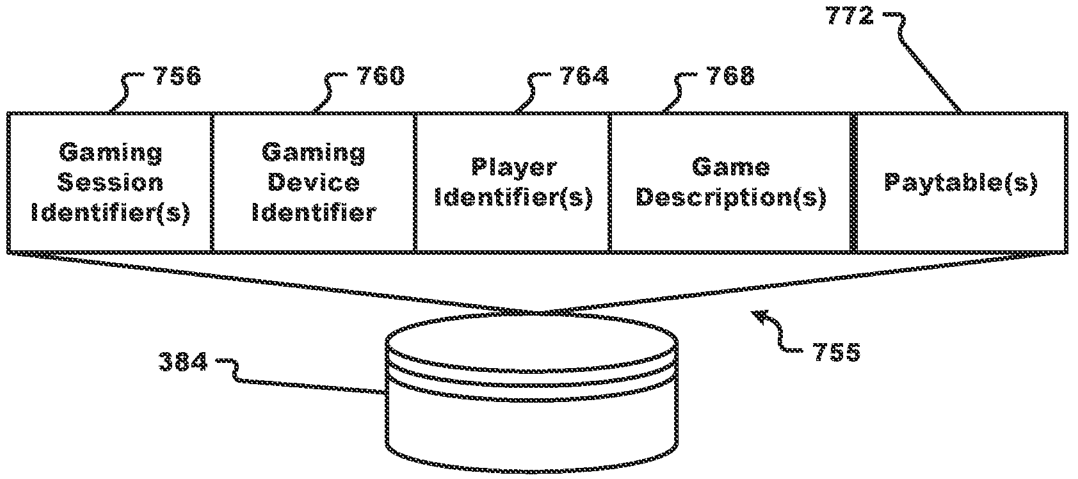
FIG. 7C is an illustrative data structure used in a player wagering account in accordance with embodiments of the present disclosure.

With reference now to FIGS. 7A-C, additional details of data that may be stored in the database 384 will be described in accordance with at least some embodiments of the present disclosure. The database 384 may be configured to store one or multiple data structures 700 that are used in connection with the various types of player engagement indicators employed by the gaming system 300.

With reference to FIG. 7A, the data structures 700 may include a plurality of data fields that include, for instance, a gaming device identifier field 704, player identifier(s) field 708, gaming session identifier field 712, and credit meter field 716.

The gaming device identifier field 704 may be used to store any type of information that identifies uniquely a gaming device 312 within the gaming system 300. The identifier field 704 may include a numeric, alphabetical or alphanumeric identifier or descriptor of the gaming device 312. In one example, the identifier field 704 comprises a unique electronic address of the corresponding gaming device 312 on the gaming network 318.

The player identifier(s) field 504 may be used to store any type of information that identifies uniquely one or more players currently interacting with the respective gaming device 312 identified in the gaming device identifier field 704. The identifier field 708 may include a numeric, alphabetical or alphanumeric identifier or descriptor of each such player. In one example, the identifier field 708 comprises a unique electronic address of the corresponding players mobile device 314 on the communications network 308. In one embodiment, the identifier field 708 comprises a unique identifier of the corresponding player associated with the player's account in one or more of the sports/mobile wallet 326, retail wallet 322, and/or casino wallet 320.

The gaming session identifier field 712 may be used to store any type of information that identifies uniquely a gaming session involving the identified one or more players currently interacting with the respective gaming device 312 identified in the gaming device identifier field 704. The gaming session identifier may be a numeric, alphabetical or alphanumeric identifier or descriptor of each such gaming session. The gaming session identifier field 712 may comprise plural gaming session identifiers for currently active gaming sessions involving one or more of the identified players in player identifier(s) field 708 and the common gaming device identifier in the gaming device identifier field 704. Stated differently, in some embodiments each identified player in the field 708 can have a corresponding different gaming session identifier in the field 716 such that the multiple identified gaming sessions are currently active on the commonly identified gaming device in field 704.

A given gaming device identifier in field 704 can correspond to multiple player identifiers in field 708, and gaming session identifiers in field 712 with respect to currently active gaming sessions on the gaming device associated with the gaming device identifier. The currently active gaming sessions can be played simultaneously or alternately by the identified players on the given gaming device. While multiple currently active gaming sessions can be in play on a commonly identified gaming device, it will be appreciated that, depending on the application, only one active gaming session can be in play on the given gaming device.

The credit meter(s) field 716 comprises first player credit meter data 720 associated with a first player identified in player identifier(s) field 708 and a first gaming session identified in the gaming session identifier field, second player credit meter data 724 associated with a second player identified in player identifier(s) field 708 and a second gaming session identified in the gaming session identifier field, . . . nth player credit meter data 732 associated with an nth player identified in player identifier(s) field 708 and an nth gaming session identified in the gaming session identifier field and joint credit meter data 740 associated collectively with the first, second, . . . nth players and first, second, . . . nth gaming sessions. The data in each of the credit meter fields comprises previously received credit information and an associated timestamp and a current credit amount balance in the corresponding credit meter. In contrast, the data in the joint credit meter field comprises links to each of the first, second, . . . nth credit meter fields, and a current joint credit meter credit amount balance and associated timestamp.

With reference now to FIG. 7B, additional details of data that may be stored in the database 384 will be described in accordance with at least some embodiments of the present disclosure. The database 384 may be configured to store one or multiple data structures 742 that are used in connection with gaming activities of a player. In some embodiments, the data stored in the data structures 742 may be stored for a plurality of different player profiles or for a single player profile. The data structure 742 may include a plurality of data fields that include, for instance, a player information field 744, a credit amount field 746, joint credit amount field 748, player history/ranking field 750, contact information field 752, and loyalty points balance field 754.

The player information field 744 and contact information field 754 may be used to store any type of information that identifies a player. In some embodiments, the player information field 744 may store one or more of username information for a player 324, contact information for the player (such as email address, phone number, social website webpage universal resource locator, and the like), password information for a player account, player status information, accommodations associated with the player 324, and any other type of customer service management data that may be stored with respect to a player 324.

The credit amount field 746 may be used to store data about a player's 324 available credit balance with the casino or a plurality of casinos. For instance, the credit amount field 746 may contain a link to the player's corresponding credit meter field in data structures 700.

The joint credit amount field 748 may be used to store data about a joint credit meter balance associated with a competitive gaming session involving the player identified in the player information field 744. For instance, the joint credit amount field 748 may contain a link to the corresponding joint credit meter field 740 in data structures 700.

The player history/ranking 750 may be used to store information describing awards that have been paid to the player 324 or that are available to be paid in response to particular events occurring within the gaming system 300. As a non-limiting example, the player history/ranking 750 may be used to store electronic records for values of awards that are available to or have been paid to the player 324. The field 750 may be used to store a player ranking associated with the corresponding player 324. Player ranking may be measured in various ways. In one embodiment, the player ranking is based on membership in a platinum, gold, silver, or bronze class, with platinum being the highest value to the casino and bronze the lowest. In one embodiment, the player ranking is based on a proficiency level or performance rank in one or more gaming sessions. Other player loyalty classification schemes are possible depending on the application.

The player history/ranking field 750 may also store data related to awards, bonuses, mini bonuses, jackpots, side bets, etc. granted to the player 324. The field 750 may also indicate when such awards were granted to the player 324, whether the awards have been redeemed, whether the awards are being funded by a game of chance or skill, a mini bonus associated with an event, or a side bet award associated with the occurrence or nonoccurrence of an event.

The loyalty points balance field 754 may be used to store current loyalty point balances by type of loyalty points for the corresponding player 124. The field 754 is incremented and decremented as loyalty points are added to and removed from the player's loyalty account.

With reference now to FIG. 7C, additional details of data that may be stored in the database 384 will be described in accordance with at least some embodiments of the present disclosure. The database 384 may be configured to store one or multiple data structures 755 that are used in connection with the other data structures 700 and 742 to manage competitive gaming sessions among multiple players. The data structure 755 may include a plurality of data fields that include, for instance, a gaming session identifier(s) field 756, gaming device identifier field 760, player identifier(s) field 764, game description(s) field 768, and pay table(s) field 772

The gaming session identifier(s) field 756 identifies each active gaming session in the gaming system 300 and can include a link to the corresponding gaming session identifier in gaming session identifier field 712 in data structures 700.

The gaming identifier field 760 identifies gaming device involved in each active gaming session identified in gaming session identifier(s) field 756 and can include a link to the corresponding gaming device identifier in gaming device identifier field 704 in data structures 700.

The player identifier(s) field 764 identifies each player involved in each active gaming session identified in gaming session identifier(s) field 756 and can include a link to the corresponding player identifier in player identifier(s) field 708 in data structures 700 and player information field 744 in data structures 742. The player identifier(s) field 764 can link each player to a player position or display or display sub-region or button deck portion or user interface portion of the common gaming device associated with the gaming device identifier in the field 760.

The game description(s) field 768 comprises a description of the game type and category played by each player in the tournament session. The field 768 can include a game counter (such as a spin counter in slots or number of hands dealt counter in video poker) for each gaming session in the tournament session. The game counter counts the current number of games played in each gaming session by a corresponding player. The game counter can be used to determine when the gaming session ends (e.g. each gaming session only lasts for a certain number of games) or when the tournament session ends (e.g., the first gaming session to hit a predetermined game counter value causes the tournament session and all its component gaming sessions to end).

The pay table(s) field 772 identifies each pay table involved in each active gaming session identified in gaming session identifier(s) field 756. While the contents of a pay table can vary according to a gaming device's and game type's complexity, a pay table typically comprises all of a game's information, including all of the winning gaming outcomes (e.g., pay lines), rules, bonuses, wager requirements, and probability and award for each winning gaming outcome. A pay table can include, for example, a number of paylines (e.g., patterns on the reels for each winning combinations), and probability of each as a game outcome (which can be less than or greater than 100% chance of having a winning outcome), a list of prizes and payouts, betting requirements, and the symbols on the reels. Because the pay table displays all possible winning outcomes, the table commonly shows for each winning combination of symbols in a specific slot game and the number of coins bet how many coins (or credits) the bettor will win.

The rules in the pay table define rules for the gaming session and each game in the gaming session. The rules, for example, can define game theme, game parameters, and gaming session duration or term. For example, the rules can define the gaming session or term as a certain amount of time measured from gaming session initiation, a certain number of game plays, a maximum amount of cumulative wagers on each game in the gaming session, a maximum amount of cumulative earned credits from the games in the gaming session, or until some other gaming event occurs (hand pay triggered, out of credits, etc.).

In some gaming session configurations, the gaming session duration or term of a currently active first gaming session of a first player on the gaming device is contingent upon or determined by the gaming session or term of a currently active second gaming session of a second player on the gaming device and vice versa. Stated differently, the first and second gaming sessions terminate upon first occurrence of a predetermined gaming event in either the first or second gaming sessions.

The currently active gaming sessions on a common gaming device can have the same or different pay tables, depending on the application. For example, the currently active first gaming session can comprise games of a first type or category while the currently active second gaming session can comprise games of a different second type or category. In another example, the first and second gaming sessions, whether playing the same or different types of games, can use pay tables having different sets of winning outcomes and/or probabilities associated with a common set of winning outcomes. The technical problem of how to manage currently active gaming sessions having different pay tables on a common gaming device can be solved by enabling the gaming server 316 to configure the pay tables via the service window.

Various gaming session examples will now be described to illustrate the teachings of the present disclosure.

Figure 8:
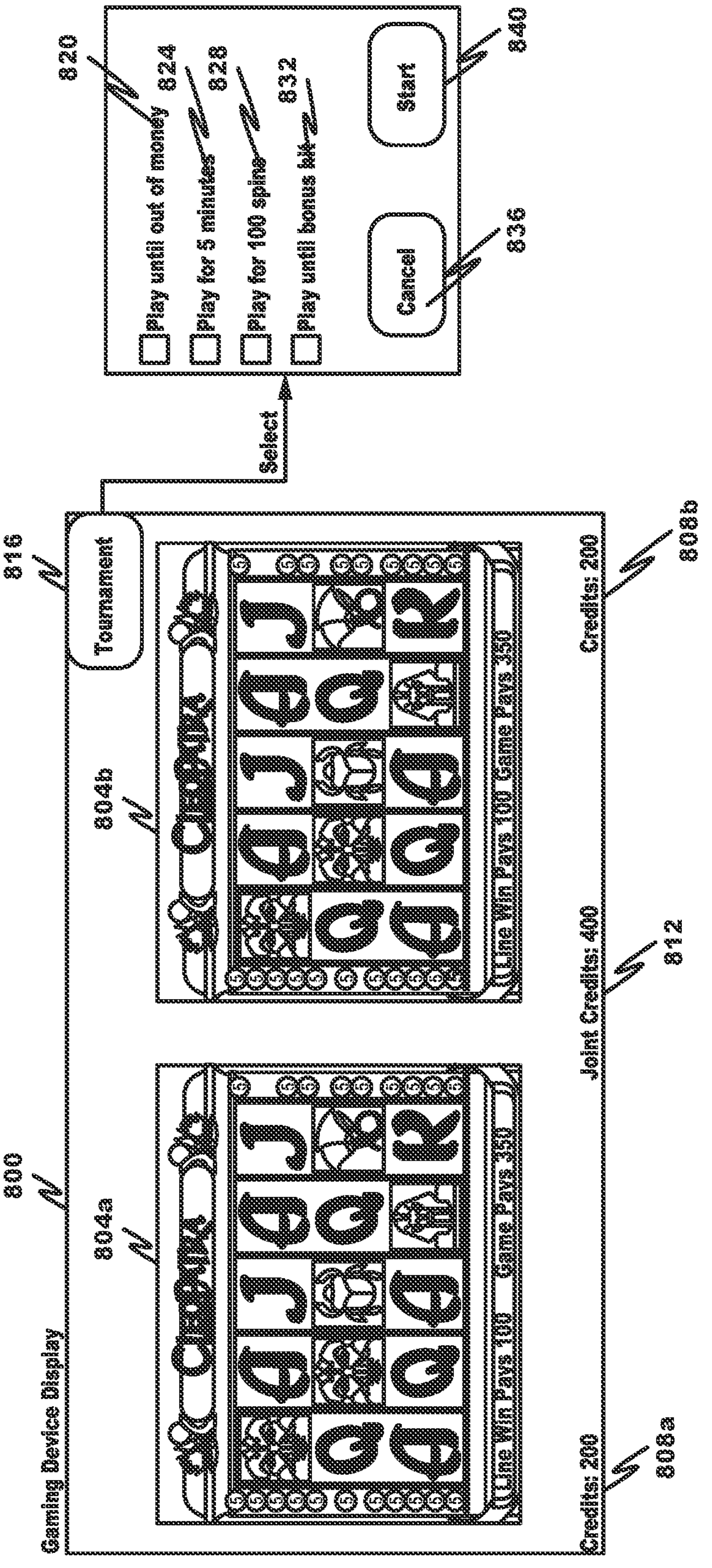
FIG. 8 is a screenshot of a gaming device display in accordance with embodiments of the present disclosure.

FIG. 8 depicts a display device 470 of a gaming device 312 displaying on display 800 different slot games 804*a,b* of a common theme in different currently active gaming sessions of different players. The slot games 804*a,b* use the same pay tables. The first or left-hand player has a first credit meter 808*a* displaying a credit amount of 200 credits, the second or right-hand player has a first credit meter 808*b* also displaying a credit amount of 200 credits, and a joint credit meter 812 associated with both first and second players displays a credit amount of 400 credits (200 credits+200 credits=400 credits).

As shown by the menu 816, one or both of the first and second players have chosen to start a tournament. The tournament session including the first and second gaming sessions can be configured (or have pay table rules defined) by the players as shown, such as to configure the tournament session term until one or more player runs out of money (option 820), one or more players has insufficient money to start a game, for a certain time period (shown as 5 minutes by option 824), for a certain number of spins (shown as 100 spins by option 828), until a bonus is hit (option 832), until a certain amount of money is won, until a certain win category is hit, or any combination of these parameters including randomized parameter value. Additionally, each player may configure his or her gaming session to have different game themes, denominations, numbers of lines selected, play speed, autohold, autoplay, etc. Once the rules of the pay table for each gaming session are defined by the respective player, the player can choose to cancel 836 or start 840 his or her gaming session.

In one embodiment each player gets to choose the game theme this wish to play and each player can be playing different themes in his or her respective gaming session. In some embodiments, the operator of the EGM can limit which games can be chosen for this feature.

Once the game types and/or categories for each gaming session and tournament configuration are determined, players can then play head-to-head in the tournament. The tournament session comprised of the first and second gaming sessions ends or terminates when the predetermined parameters is reached or the predetermined gaming event occurs, such as after a certain number of games or expiration of a certain period of time.

Figure 9:
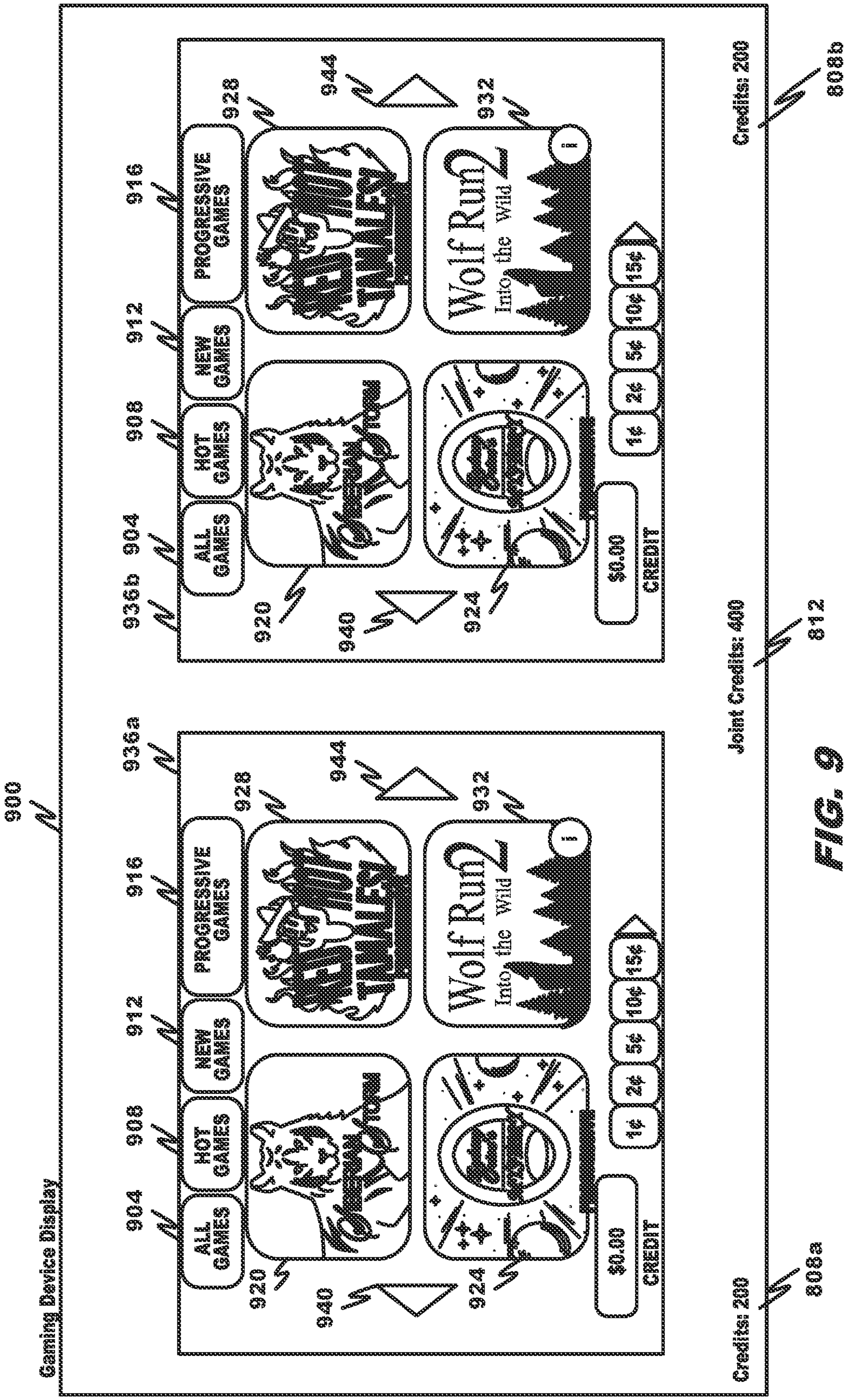
FIG. 9 is a screenshot of a gaming device display in accordance with embodiments of the present disclosure.

FIG. 9 depicts the embodiment in which each player can select a game theme for a common type or category of game. The display 900 provides the first of left-hand player and second or right-hand player with the following options: all games 904 to show all games selectable by the respective player for his or her gaming session, hot games 908 to filter through all of the selectable games and show only the hot games based on selection history by players of the gaming system, new games 912 to filter through all of the selectable games and show only the newest games introduced after a determined date, and progressive games 916 to filter through all of the selectable games and show only the games having progressives. Depending on the option selected, the resulting game options, shown as games 920, 924, 928, and 932 are displayed in the central portion of the sub-display region 936*a,b*. Toggles 940 and 944 enable the player to move left and right through the various game options.

Figure 10:
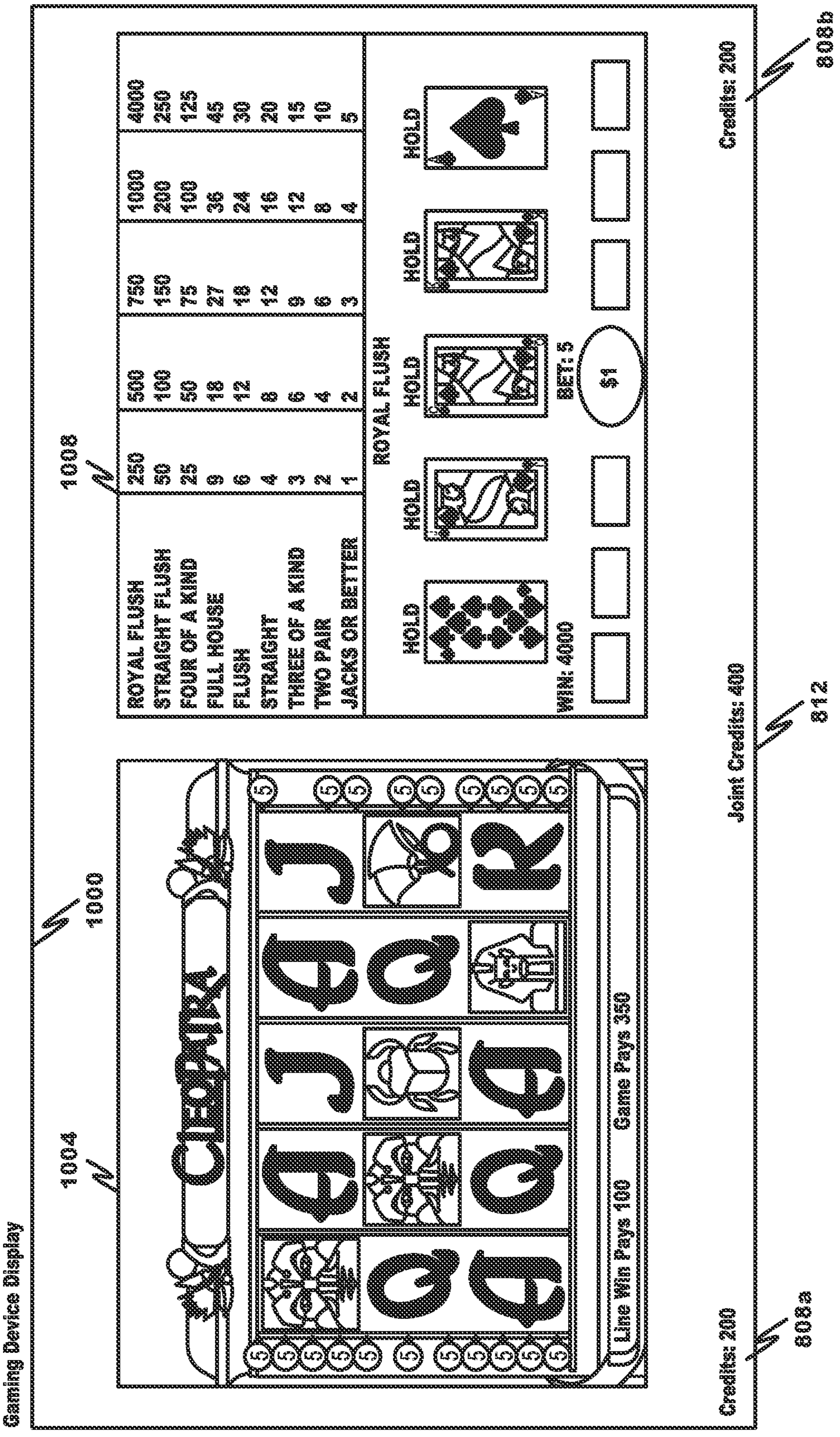
FIG. 10 is a screenshot of a gaming device display in accordance with embodiments of the present disclosure.

FIG. 10 depicts games in concurrently active first and second gaming sessions of first and second players. The display 1000 displays in a first sub-display region 1004 a first game of the first gaming session as slots and in a second sub-display region 1008 a second game of the second gaming session as video poker.

Figure 11:
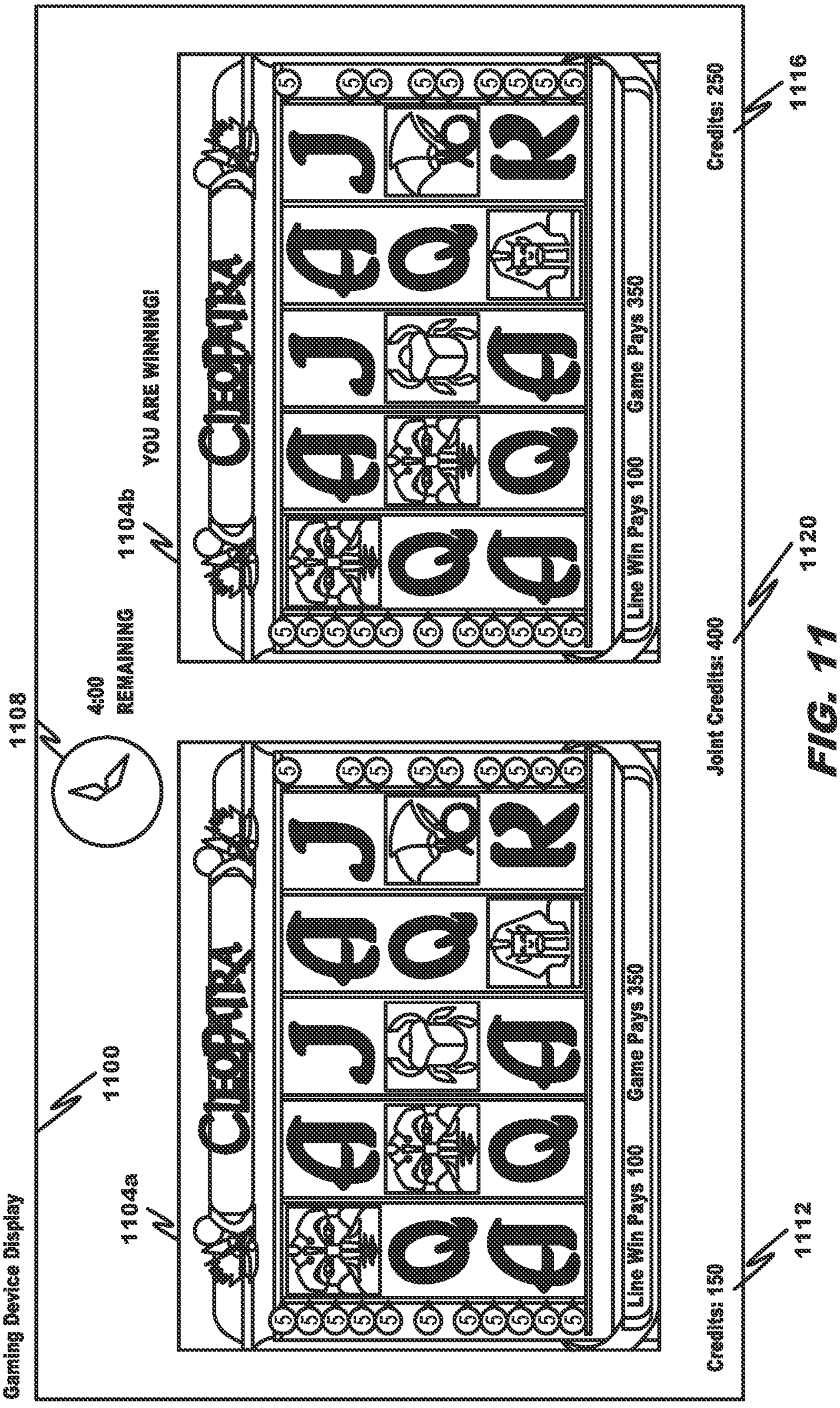
FIG. 11 is a screenshot of a gaming device display in accordance with embodiments of the present disclosure.

FIG. 11 shows an example gaming device display 1100 of a tournament session in progress that comprises first and second games of first and second gaming sessions displayed in sub-display regions 1104*a* and *b*, respectively. There are 4 minutes left on the clock 1108 and, as can be seen by the first and second credit meters 1112 and 1116, the second player on the right is winning. The joint credit meter 1120 displays 400 credits, or the sum of the credit amounts in the first and second credit meters. It is to be appreciated that the credit meters can be in the game windows. For example, the credit meters can be in the positions of the "Line Win" and "Game Pays" meters.

It is to be further appreciated that the joint credit meter could roll up after the tournament ends. This is common in bonus games where the bonus accumulates credits and the game meter rolls up after the bonus ends.

In one embodiment, the two players can start with the same credit balance. At the start of the tournament, the cabinet credit meter is split in half with each player starting with the same credit balance.

In another embodiment, both players play from the same credits meter. When the left or right player presses their respective spin button, the money is taken from a common credit meter. This would likely be used with a timed tournament. In this embodiment, the credit amounts in the first and second credit meters would need to be periodically reconciled so that each has the same credit amount balance.

In another embodiment, the players separately enter money into the gaming device. The gaming device alternately prompts each of the players to insert money into the currency in device 458 and associates the inserted money with the corresponding player that is prompted.

Figure 12:
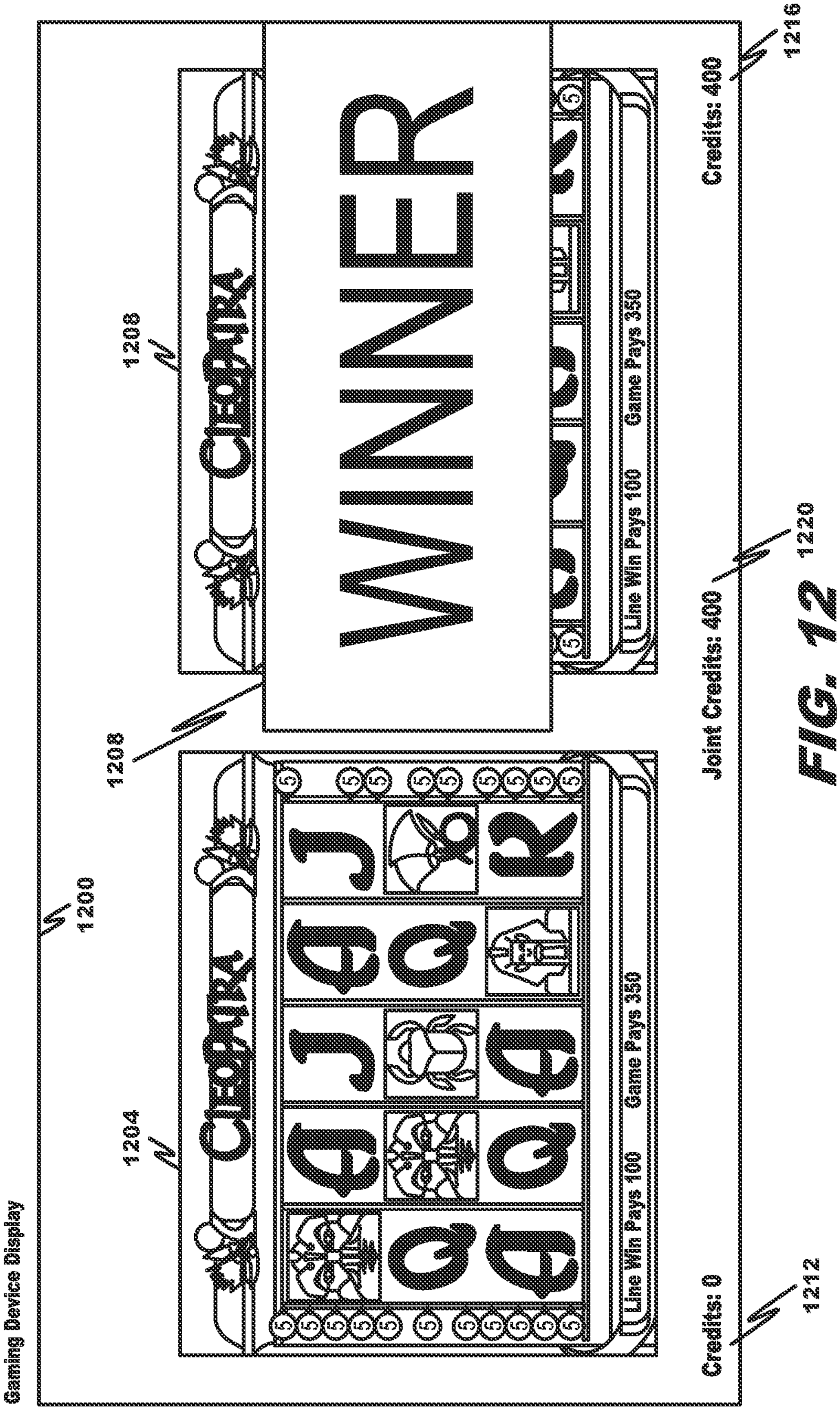
FIG. 12 is a screenshot of a gaming device display in accordance with embodiments of the present disclosure.

FIG. 12 shows the display 1200 after the tournament session ends. The player on the right-hand side is declared the winner as shown by the WINNER banner 1208 in the second sub-display region 1208 and no such banner in the first sub-display region 1204. The first player's first credit meter 1212 credit amount balance is "0" while the second player's second credit 1216 credit amount balance is "400" showing that the balance of the first credit meter 1212 has been transferred automatically by the gaming device and added to the credit amount balance of the second credit meter 1216 of the winning second player. The credit amount balance of the joint credit meter 1220 remains unchanged as it is the mathematical sum of the credit amount balances of the first and second credit meters 1212 and 1216.

As shown by FIG. 12, the gaming device selects a winning player at the end of the tournament session. The gaming device typically displays the winner and celebrates the win. In some embodiments, the winner earns player loyalty points, social points, or an achievement for winning the tournament session.

In one embodiment, the host or gaming server 316 records the win/loss records for historical purposes in player history/ranking field 750. For example, Bob and Suze play the tournament many times for a few weeks. The gaming system 300 records that Suzie won 12 times and Bob won 6 times.

In one embodiment, the winning player is allowed to pick the next tournament parameters, such as the denomination, game theme, game duration, number of games in each of the first and second gaming sessions, and other parameters.

In another embodiment, the losing player is allowed to pick the next tournament parameters, such as the denomination, game theme, game duration, number of games in each of the first and second gaming sessions, and other parameters.

Figure 13:
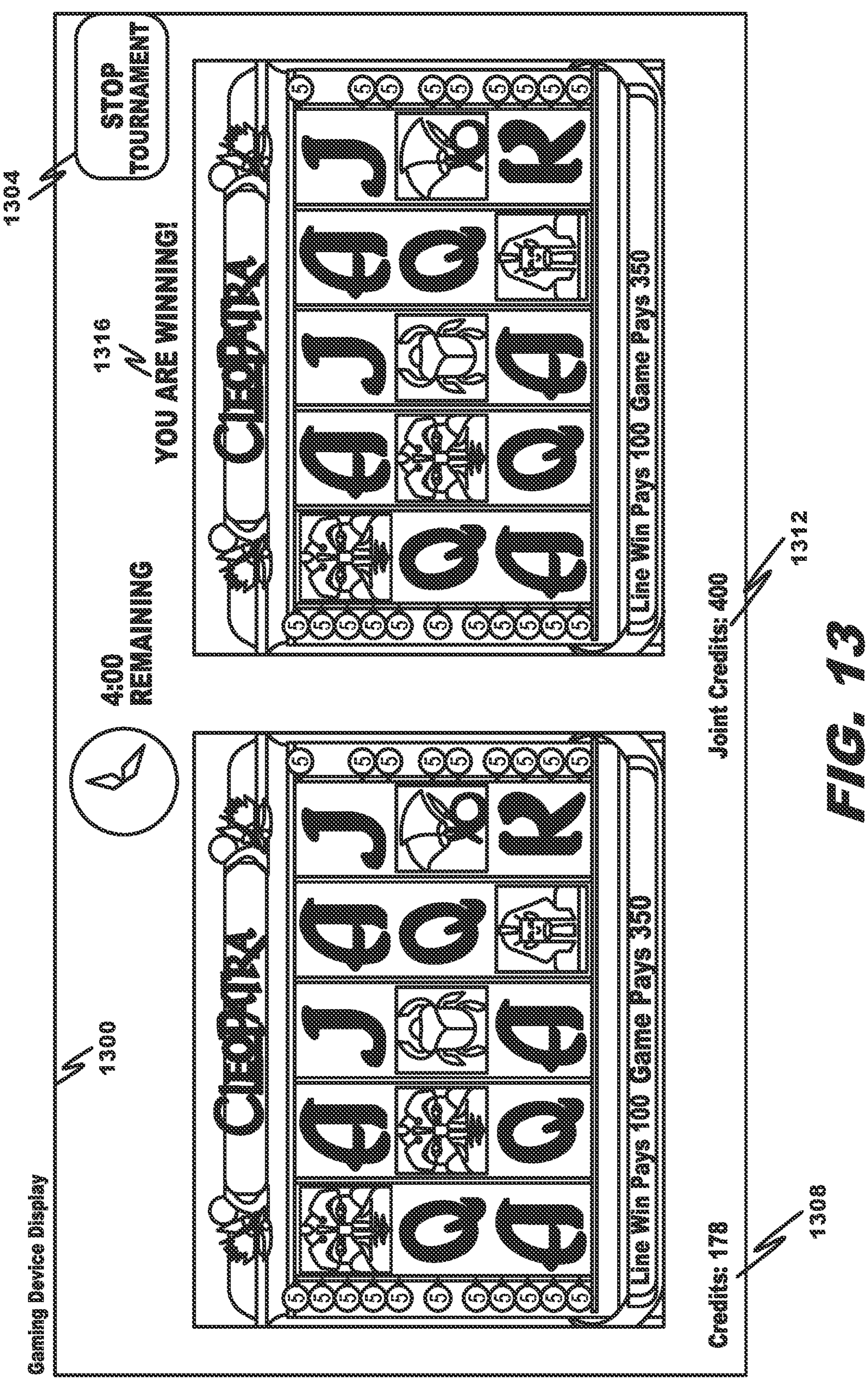
FIG. 13 is a screenshot of a gaming device display in accordance with embodiments of the present disclosure.

In one embodiment shown in the display 1300 of FIG. 13, one or both of the first and/or second players can choose to end/stop/cancel the tournament session and the component first and second gaming sessions of the first and second players, respectively, at any time by selecting stop tournament icon 1304. The display 1300 shows only the first credit amount balance of the first credit meter 1308 and not the credit amount balance of the second credit meter as the first player is currently playing a game of the first gaming session while the second gaming session of the second player is currently suspended until the first player's turn ends and the second player's turn begins. The credit amount balance of the joint credit meter 1312 is displayed continuously through both the first and second gaming sessions. The banner 1316 indicates that the second player is currently winning.

FIGS. 14-17 depict various screen shots of the first and second players selecting video poker as the first and second gaming sessions. In the simplest embodiment, there is only one poker hand drawn for both players. FIGS. 14-17 show a series of exemplary displays of a video poker hand dealt for both first and second players. Both players can choose to hold their cards. In one embodiment, the button deck 116 has separate hold button for left and right players. In one embodiment, one player uses a touch screen as the display to hold cards while the other player uses the button panel to hold cards. In another embodiment, the touchscreen has separate "Hold or Discard buttons" for each player, and both players use the same touchscreen.

In another embodiment, the touch screen as the display has fingerprint or the ability to uniquely identify each player, and both players use the touch same screen.

To start the poker game gaming sessions, one or more players presses a DEAL/START button on the button deck 116. In one embodiment, only one of the first and second players presses the button (either a specific player or any player). In another embodiment, both the first and second players must press his or her respective button to start the new first and second gaming sessions, respectively.

Figure 14:
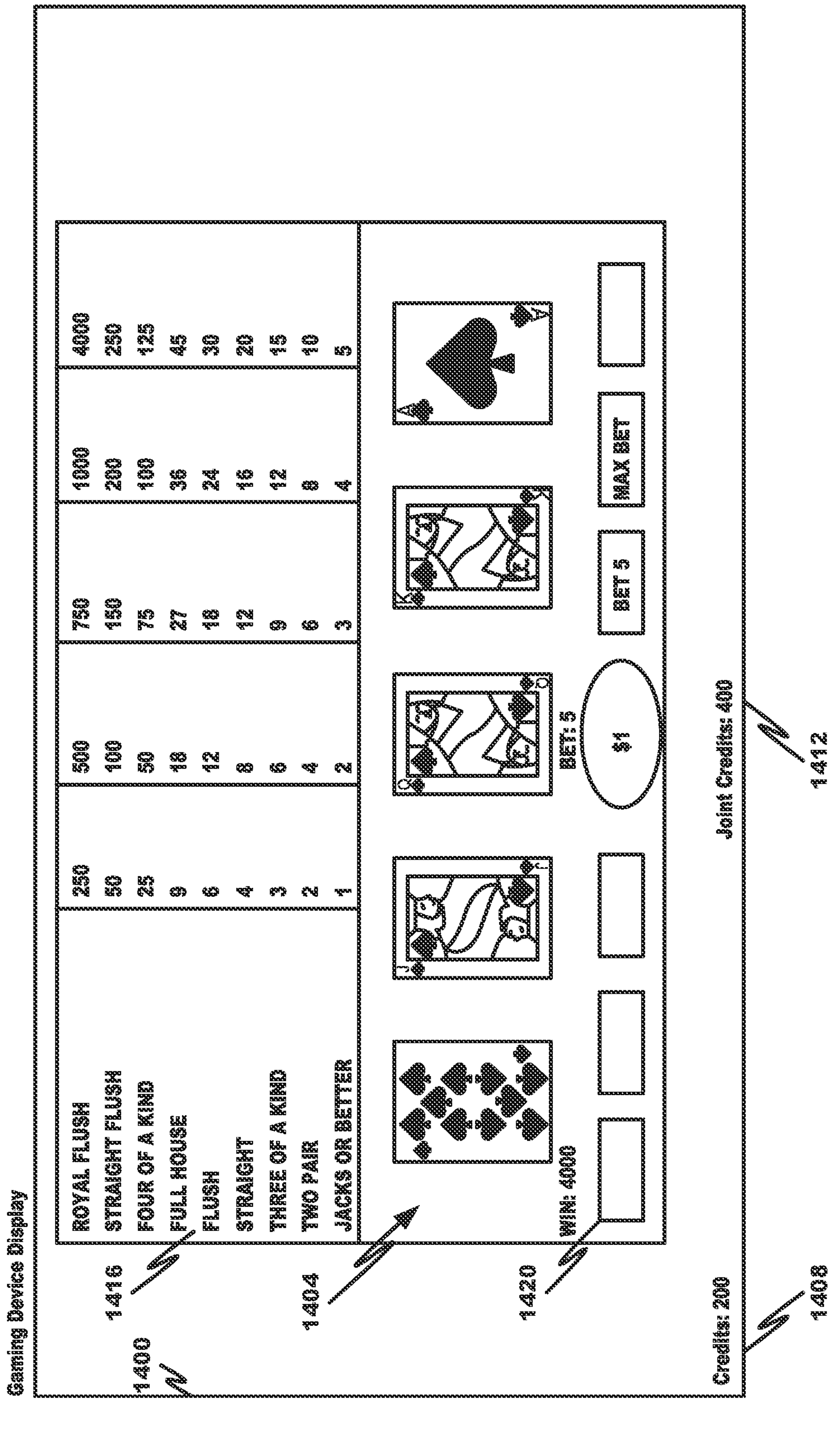
FIG. 14 is a screenshot of a gaming device display in accordance with embodiments of the present disclosure.

In response, the gaming device 312 deals each player a hand as shown by the display 1400 of FIG. 14. While the display 1400 comprises only one of the player's hands 1404 and credit meter 1408 as well as the joint credit meter 1412, other embodiments provide a display comprising the hands and credit meters of both players simultaneously. The upper sub-display region 1416 displays the various winning outcomes of the gaming session as well as a corresponding number of credits paid for each outcome. The lower sub-display region 1420 displays various selectable icons for wagering and other player commands.

Figure 15:
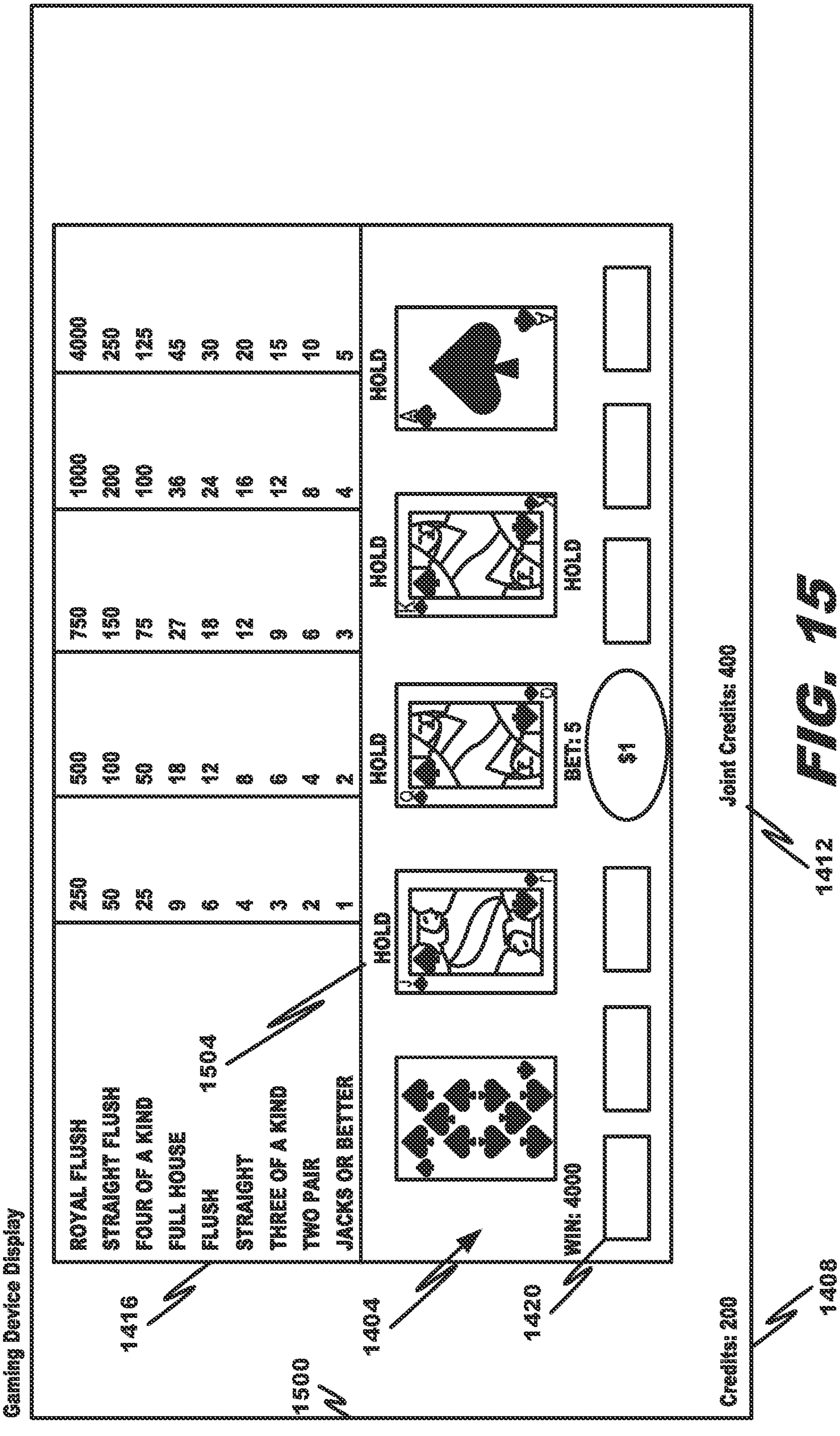
FIG. 15 is a screenshot of a gaming device display in accordance with embodiments of the present disclosure.

With reference to FIG. 15, each player decides which card or cards he or she selects to "HOLD" 1504 or in other embodiments "DISCARD". In the display 1500, the player has held four of the five cards and discarded the 10 of spades. There are many graphical methods to distinguish which player held which card(s) including: different color for the hold text, different font for the hold text, different location for the hold text, left player on top of the card, right player on the bottom of the card, both players on top of the card, but the left player text above right player text, a different graphic or icon, and a display on the side of the screen.

In one embodiment, the first and second players are allowed to hold the exact same cards and result the game in a tie. In one embodiment, the first and second players are not allowed to hold any of the same cards such that when a player holds a card, the other player is not allowed to. In one embodiment, two hands of poker are drawn with the same cards.

In one embodiment, multi-hand poker is played. For example, if a first player draws two cards and second player draws three cards, the draw can be handled two ways using the same deck. First, the first player one draws first and second cards off the top of the deck, and the second player draws the same cards, plus a third card off the top of the deck. Second, the first player draws first and second cards off the top of the deck, and then the second player draws third, fourth and fifth cards off the top of the deck. The method of who draws off the deck first could be fixed (always the first player), alternates between players, random, or determined by who pressed the draw button first.

In one embodiment, when the draw happens, a single hand from which the first and second players choose separately to hold cards is split into two separate hands (the left-hand first player hand and the right-hand second player hand). Each hand can then be evaluated separately to see who won.

In any of the above embodiments, the cards can be dealt from a common virtual deck or separate virtual decks of cards (e.g., each player has a separate virtual deck of cards).

After the hold cards are determined, the evaluation can happen. In one embodiment, one player press a draw button (either player) on the button deck 116. In another embodiment, both players have to press the draw button (separate draw/spin buttons for each player on the button deck 116) to discard the cards and deal the draw cards. After the discards and draw cards are displayed, the winning player is shown. This would be the player that has held the hand that won the most. If no player has won, no winner is shown.

Figure 16:
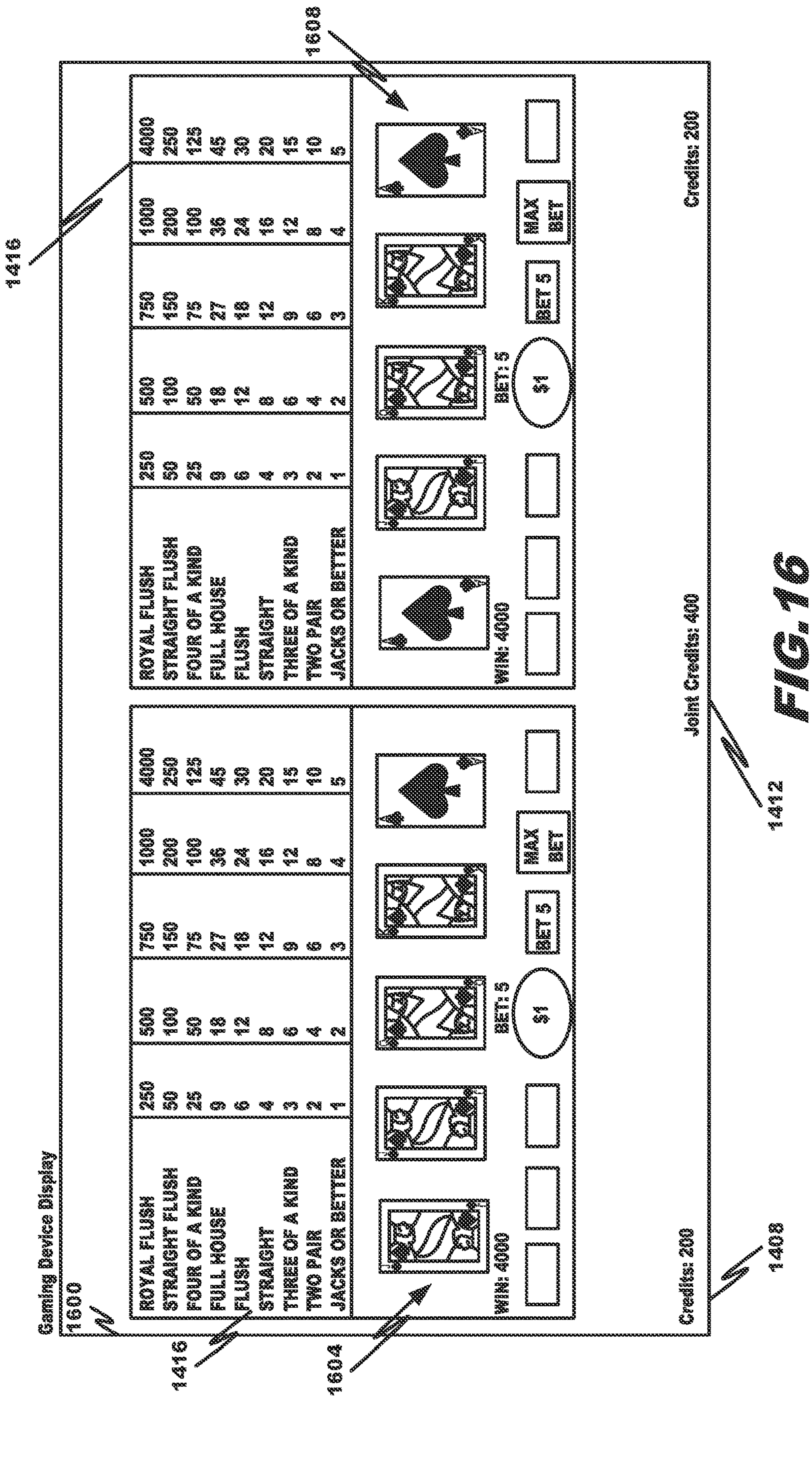
FIG. 16 is a screenshot of a gaming device display in accordance with embodiments of the present disclosure.
Figure 17:
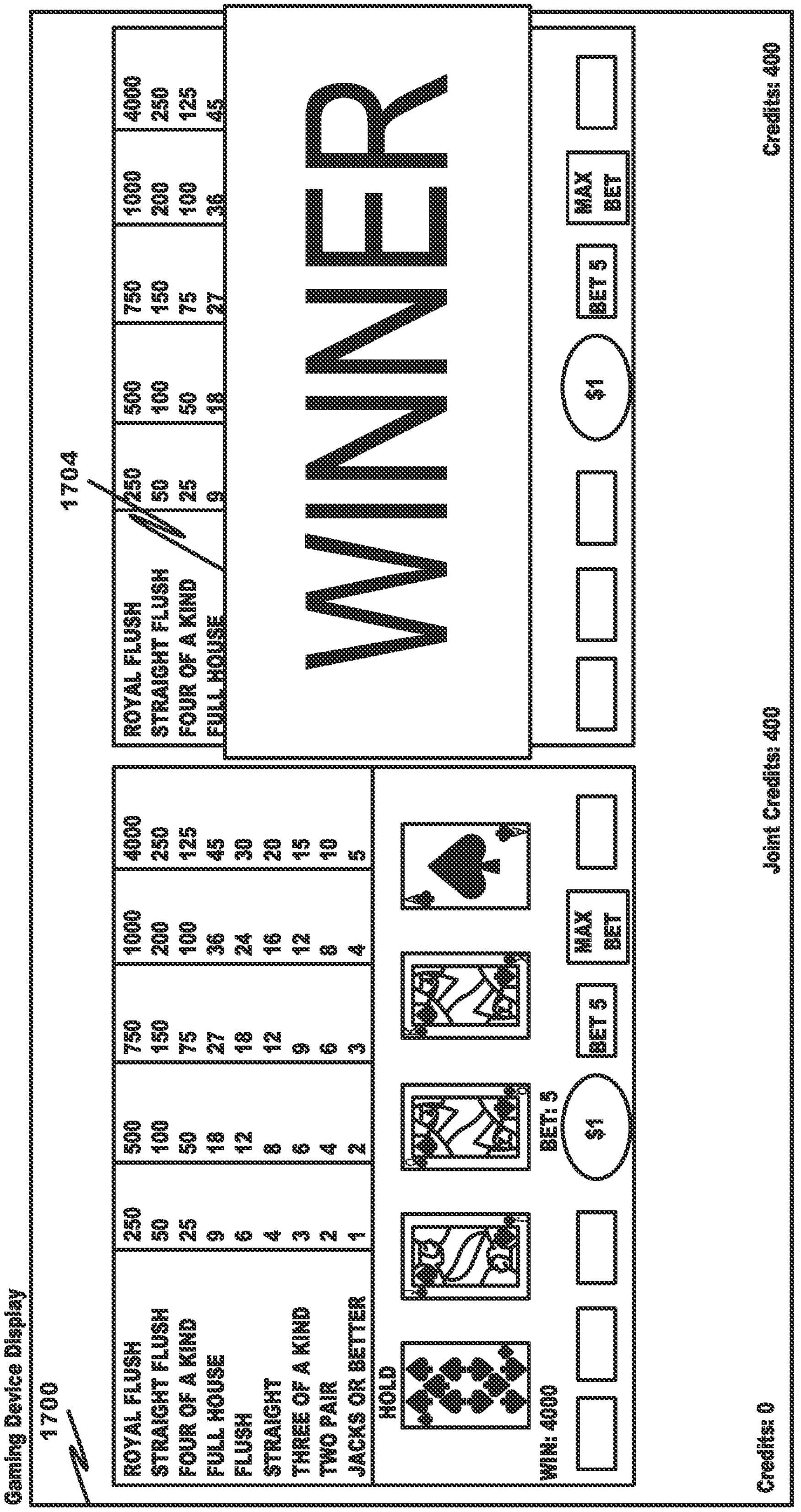
FIG. 17 is a screenshot of a gaming device display in accordance with embodiments of the present disclosure.

After further cards are dealt to replace the discarded cards as shown by the display 1600 of FIG. 16 and each of the first and second players receives a new hand of cards 1604 and 1608, respectively, the winning player is determined as the second or right-hand player. As shown by a winning banner 1704 in a subsequent display 1700 of FIG. 17, the second player is shown as the winning player and the credits of the first player transferred automatically to the credit meter of the second player.

In another embodiment, the players credits would not transfer to the other player. Players would keep their winnings working towards a grand total (tournament win). In another embodiment, each player is allowed to pick win categories in a respective pay table for his or her gaming session, such as two of a kind in video poker or 3 cherries on a slot game. If the win category is hit, the player "wins" that money. The gaming device tracks the wins over time. It is likely that the game starts like a tournament with a fixed amount of time or amount of wagers. As each player "wins", the money goes to the player's respective individual credit meter and/or to the common or joint credit meter. The transfer (rollup) to the common or joint credit meter could happen after the tournament ends.

Figure 18:
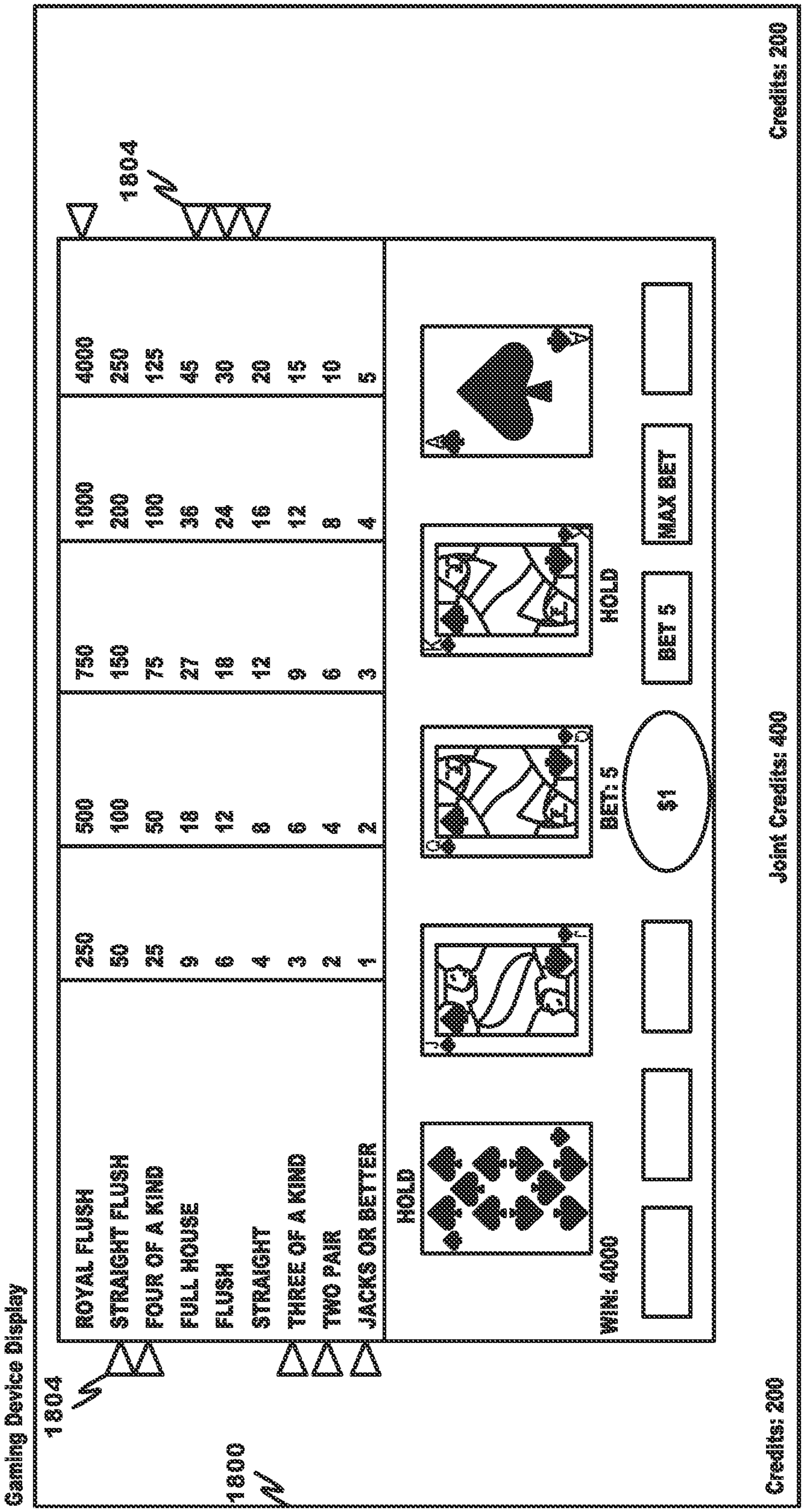
FIG. 18 is a screenshot of a gaming device display in accordance with embodiments of the present disclosure.

FIG. 18 shows an exemplary display 1800 of a video poker game. The win categories are shown by the right and left-facing arrows 1804. In the display 1800, the first player has selected straight flush, four of a kind, three of a kind, two pair, and jacks or better as the first set of winning outcomes for the first gaming session while the second player has selected royal flush, full house, flush, and straight as the second set of winning outcomes for the second gaming session. The winning outcomes can be non-overlapping or overlapping depending on the application. The arrows 1804 of the first and second players can be different colors or otherwise have different appearances. In other embodiments, there is a "Pick Categories" button on the button deck 116 with a separate interface for picking categories. In one embodiment, there are touch areas on the left for the left or first player to choose and similarly for the right or second player so that the game logic does not need to detect which player selected which category (no fingerprint detection needed). In one embodiment, one or more categories is always selected for both players. For example, the royal flush is always available to both players and cannot be picked. In one embodiment, one or more categories are randomly assigned to a player.

Figure 19:
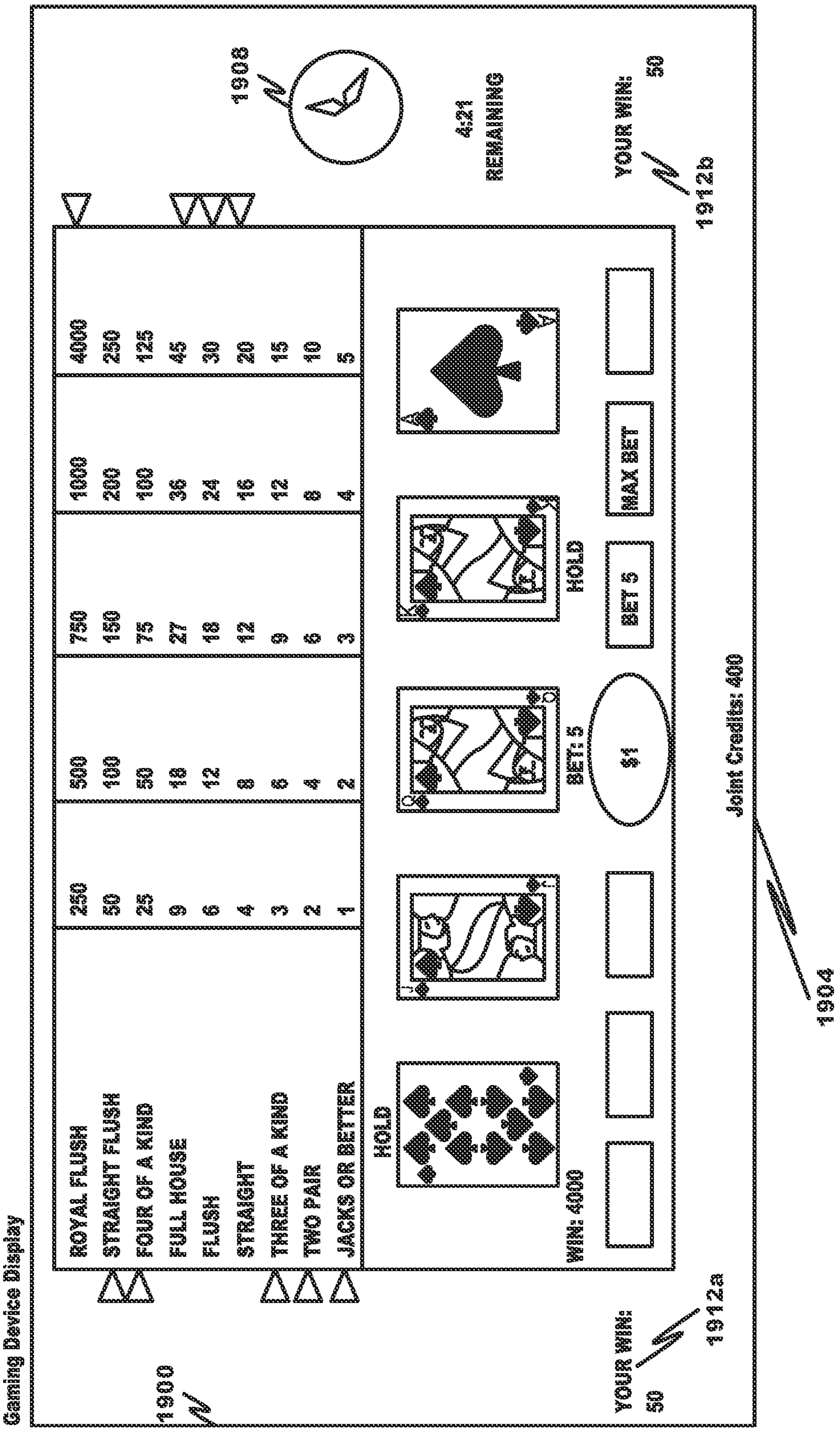
FIG. 19 is a screenshot of a gaming device display in accordance with embodiments of the present disclosure.

FIG. 19 shows display 1900 for a gaming session in progress. The display 1900 shows the amount of time remaining 1908, how much each player has won 1912*a*,*b*, and the total amount won by both of the players on the joint credit meter 1904. In an embodiment, there is a single joint credit meter 1904 for the gaming device such that each player does not have a separate individual credit meter. The players are simply playing a single hand of poker (or whichever game) and guessing which win categories will win. When the session is over, such as after the timer has expired, a winner is declared. The game in the gaming session can be video poker, slots, king, or bingo among others while only video poker has been shown.

In another embodiment, the first and second players agree to play against each other, either in general, for a fixed amount of time or fixed amount of play (e.g., number of games or player-initiated events in a game). Each player takes turns making the selection and the winner of the tournament session is displayed and determined after the session ends.

Figure 20:
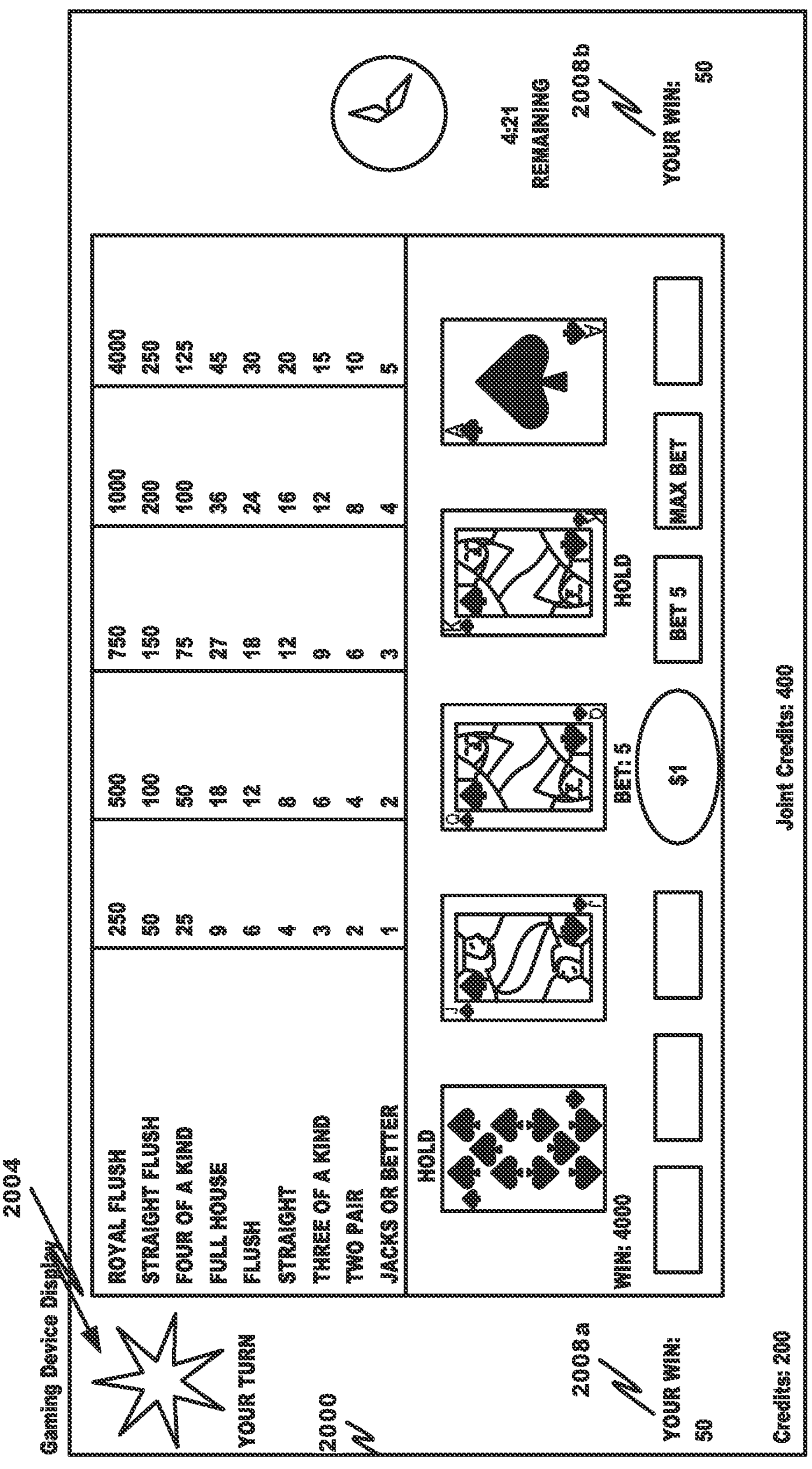
FIG. 20 is a screenshot of a gaming device display in accordance with embodiments of the present disclosure.
Figure 21:
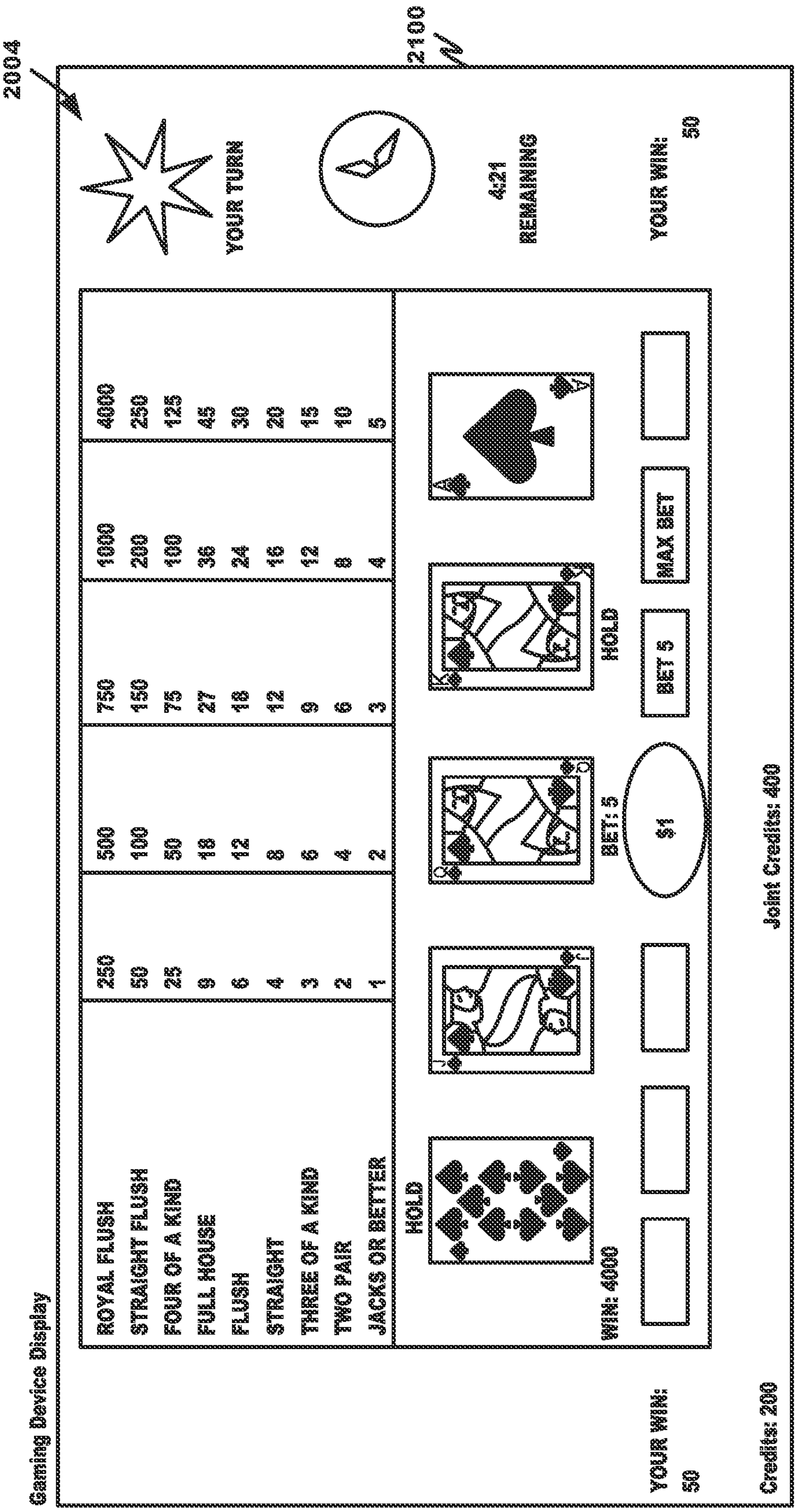
FIG. 21 is a screenshot of a gaming device display in accordance with embodiments of the present disclosure.

FIG. 20 shows an example display 2000 for this embodiment. The icon 2004 comprising the red "star" and text "Your Turn" indicates that it is the left or first player's turn to play the poker hand. All wins on the play in the first gaming session go to the left player's win ("Your Win" meter 2008*a*) for the session. Likewise, all wins on the play in the second gaming session go to the right player's win ("Your Win" meter 2008*b*) for the tournament session. Alternate displays could indicate "Left Players Turn" or other graphics, sounds or light on the left of the cabinet or gaming device display. As shown by example display 2100 of FIG. 21, the gaming device toggles back and forth between the first and second gaming sessions and suspends the gaming session of the player when it is the other player's turn.

Figure 22:
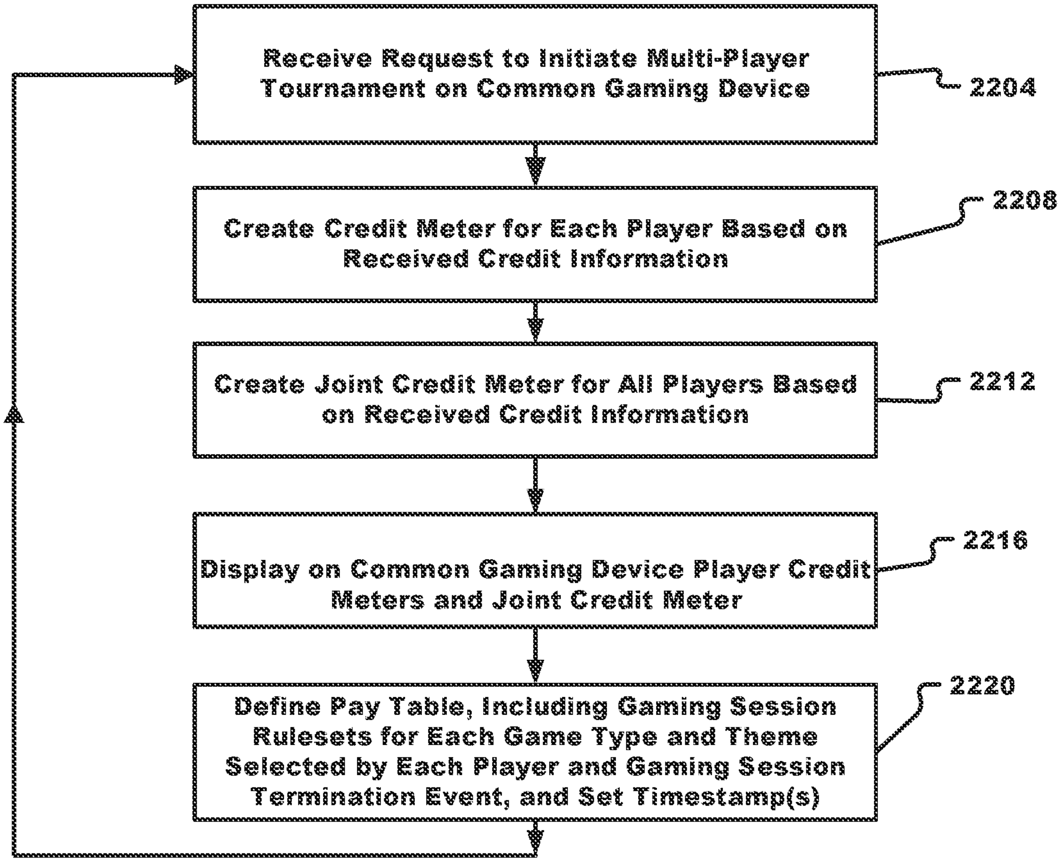
FIG. 22 is a flow diagram depicting a method of creating a multi-player gaming session on a gaming device in accordance with embodiments of the present disclosure.
Figure 23:
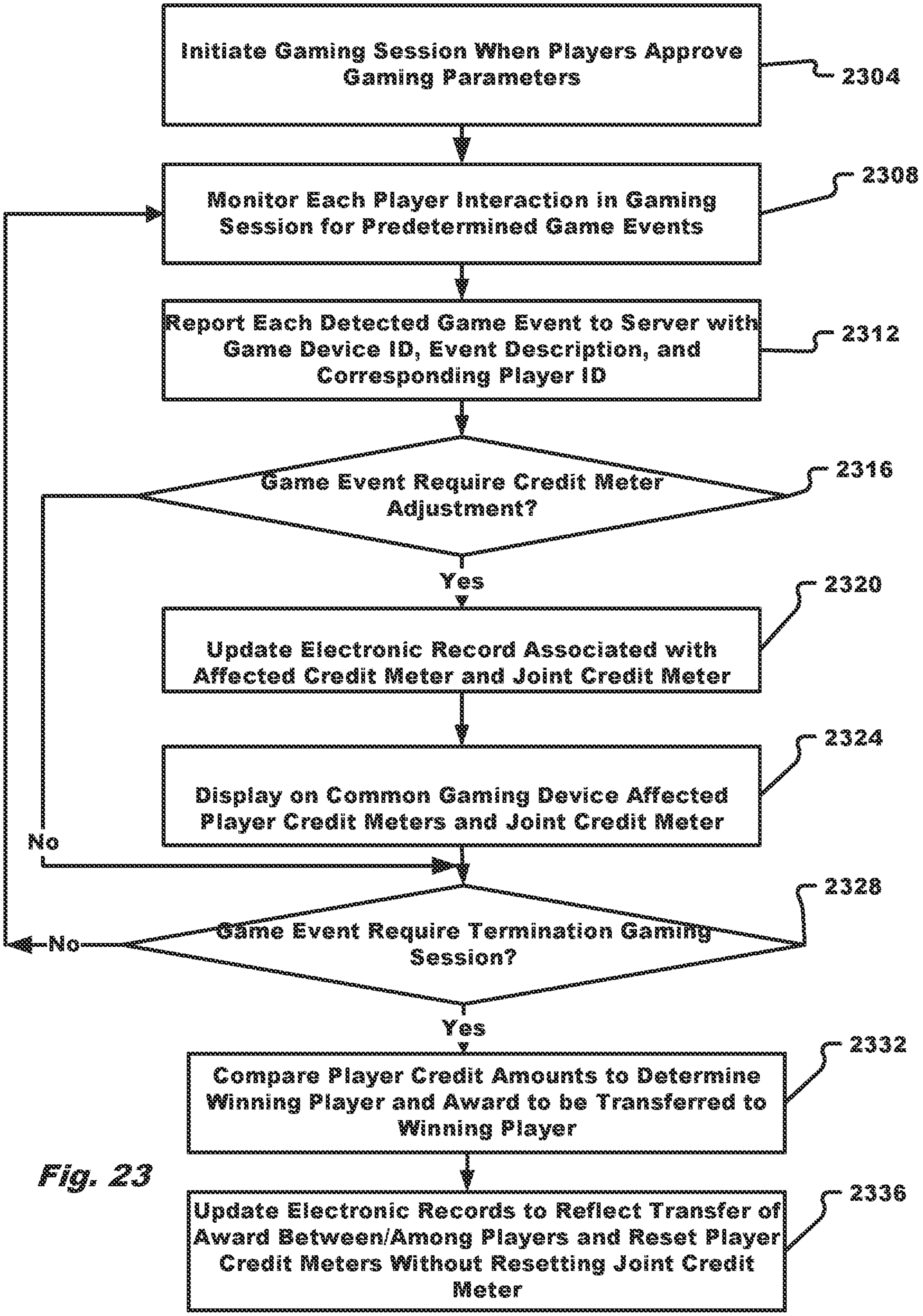
FIG. 23 is a flow diagram depicting a method of managing a multi-player gaming session on a gaming device in accordance with embodiments of the present disclosure.
Figure 24:
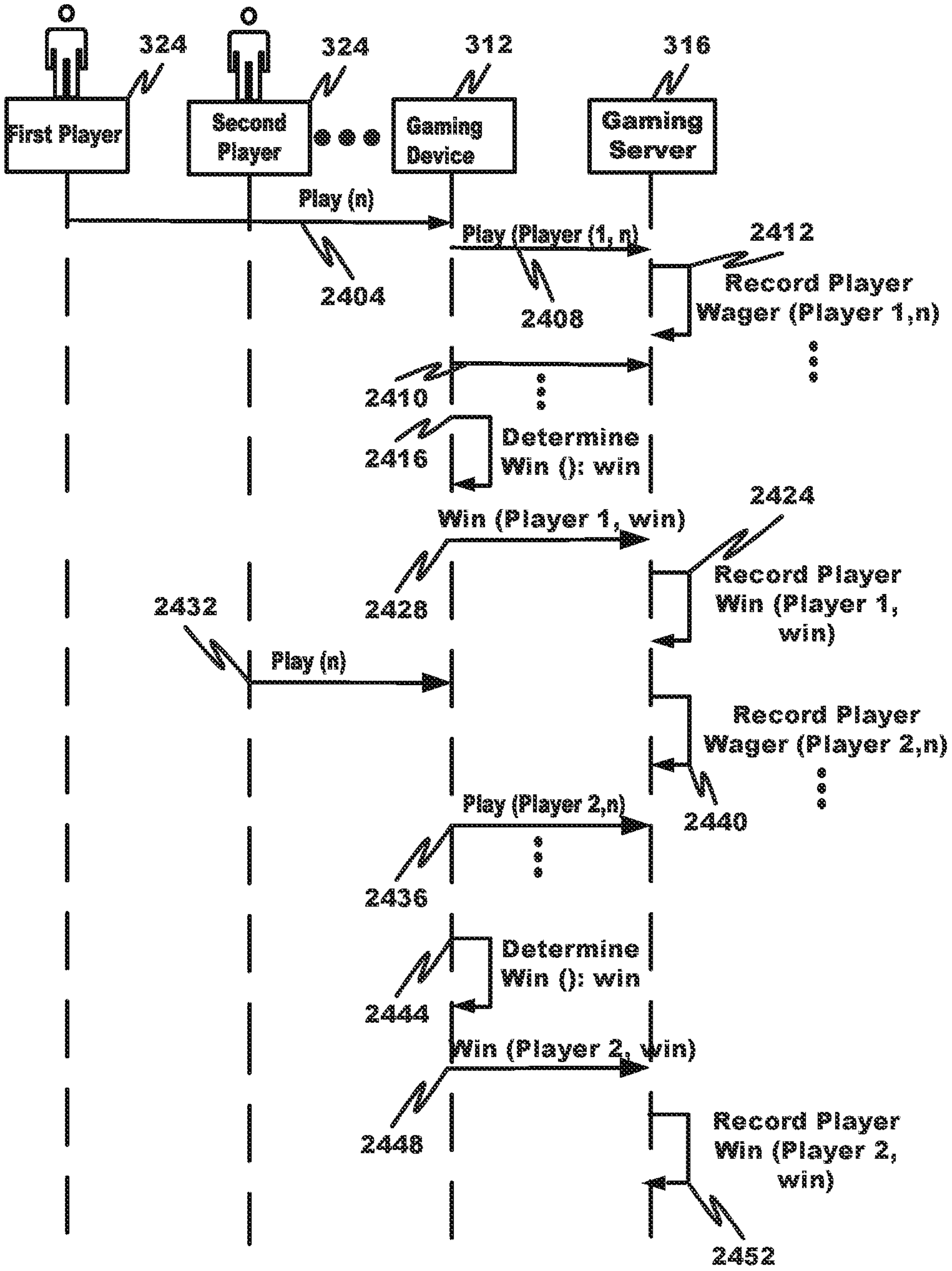
FIG. 24 is a picket fence diagram depicting a series of electronic messages and transactions for creating and managing a multi-player gaming session in accordance with embodiments of the present disclosure.

FIGS. 22-23 depict logic flows for different embodiments of the present disclosure. As will be appreciated in the embodiments, the gaming system 300 could be created for a group of machines, an entire casino, or multiple casinos. The processors in the gaming machines 312 communicate with each other and the gaming server either directly or through a SMIB (Slot Machine Interface Board) and/or service window. The service window is a display that represents a slot account host or gaming server 316. It can be displayed on the SMIB or could be a display on the EGM screen (e.g., a web browser displayed on the EGM that interacts with the gaming server). A mobile application on the player's mobile device 314 can communicate with the service window or SMIB and that service window or SMIB can in turn communicate with the gaming server 316 to allow the mobile application user to perform various gaming operations. The mobile application would have some mechanism for the user to log into their player account, such as any of the authentication methods described below. In this model, the gaming server 316 can transfer the award amount to the gaming device 312. In one embodiment this is achieved as an SAS AFT transfer as discussed below with reference to FIG. 24.

In some embodiments, each gaming session alternately controls the entire gaming device display, or across the display sub-regions of each player. In other words, common paylines from either the first or second gaming session appear across the entire gaming device display, or across the display sub-regions of each player.

With reference now to FIGS. 22-23, a method of creating a tournament session between multiple players will be described in accordance with embodiments of the present disclosure.

The method begins in step 2204 with the gaming server gaming device 312 receiving an electronic request 2404 from one or more of the players 324 to initiate a multi-player tournament on a common gaming device 312. The multi-player tournament session can include first, second, . . . nth players 324.

The method may continue in step 2208 by the gaming device 312 or gaming server 316 creating a credit meter for each player based on received credit information received via electronic message 2408, and in step 2212 by the gaming device 312 or gaming server 316 creating a joint credit meter for all players based on the cumulative received credit information. This is shown by the recordation by the gaming server of a transaction 2412 recording a wager or credit by the first player. This process is repeated for each of the n players.

The credit information can include, for example, basic meter polls, such as coin in, coin out, coin drop, canceled credits, and games played, bill validator accounting meter inputs and outputs, cashable and non-cashable promotional and other funds and credits, multi-game accounting, gaming awards (e.g., bonuses won, progressives won, jackpots won, etc.), ticket transactions (ticket in/ticket out (TITO), and the like.

The method may continue in step 2216 by the gaming device 312 or gaming server 316 displaying on the common gaming device 312 one or more individual player credit meters and the joint credit meter.

The method may continue in step 2220 defining the pay table to be used for each gaming session in the tournament, including defining gaming session rulesets for each game type and theme selected by each player, tournament or gaming session termination event(s), and setting timestamps to start the tournament session. When the tournament or gaming sessions are time limited, the timestamp represents a start time for the clock monitoring the tournament session and/or each clock monitoring each gaming session.

The logic returns to step 2204 to await a further or next request.

With reference now to FIG. 23, a method of managing a tournament session between multiple players will be described in accordance with embodiments of the present disclosure.

The method begins in step 2304 by initiating, concurrently or consecutively, each gaming session of the tournament session when the players approve the gaming parameters in a common or their respective pay table(s).

In step 2308, the gaming device 312 monitors each player interaction in their respective gaming sessions for predetermined game events.

In step 2312, each detected game event is reported by a corresponding electronic message 2410 to the gaming server 316 with the gaming device identifier, detected game event description, corresponding player identifier associated with or responsible for the gaming event and a corresponding timestamp for occurrence of the detected game event.

In decision diamond 2316, the gaming server 316 determines whether the detected game event requires an individual and/or joint credit meter adjustment.

When an adjustment is required, the gaming server 316, in step 2320 updates an electronic record associated with the affected individual player credit meter and/or joint credit meter.

In step 2324 the gaming device 312 and/or gaming server 316 displays on the common gaming device 316 the affected individual player and/or joint credit meters.

When the game event does not require credit meter adjustment or after step 2324, the gaming device 312 or gaming server 316 in decision diamond 2328 determines whether to the detected game event requires termination of the gaming session.

When no termination is required, the gaming device 312 or gaming server 316 returns to step 2308.

When termination is required, the gaming device 312 proceeds to step 2332 and, as shown by transaction 2416, compares player credit amounts for each player in the multi-player tournament session to determine a winning player and award to be transferred to the winning player. The gaming device 312 notifies the gaming server 316 by electronic message 2428 which player (shown as the first player) is the winning player, and the gaming server by transaction 2424 causes the database management system of the database 384 to record the winning player in the database.

In step 2336, the gaming server 316 updates electronic records to reflect a transfer of the award from the non-winning player(s) to the winning player and resets the player credit meters without resetting the joint credit meter.

The players can initiate a new gaming session as shown by electronic message 2432 comprising further player wagers or credits and resulting transaction 2440, electronic message 2436 comprising detected game events and associated information noted above, transaction 2444 determining the winning player, electronic message 2448 comprising the winning player, and transaction 2452 of the database management system of the database 384 recording the winning player in the database.

Figure 25:
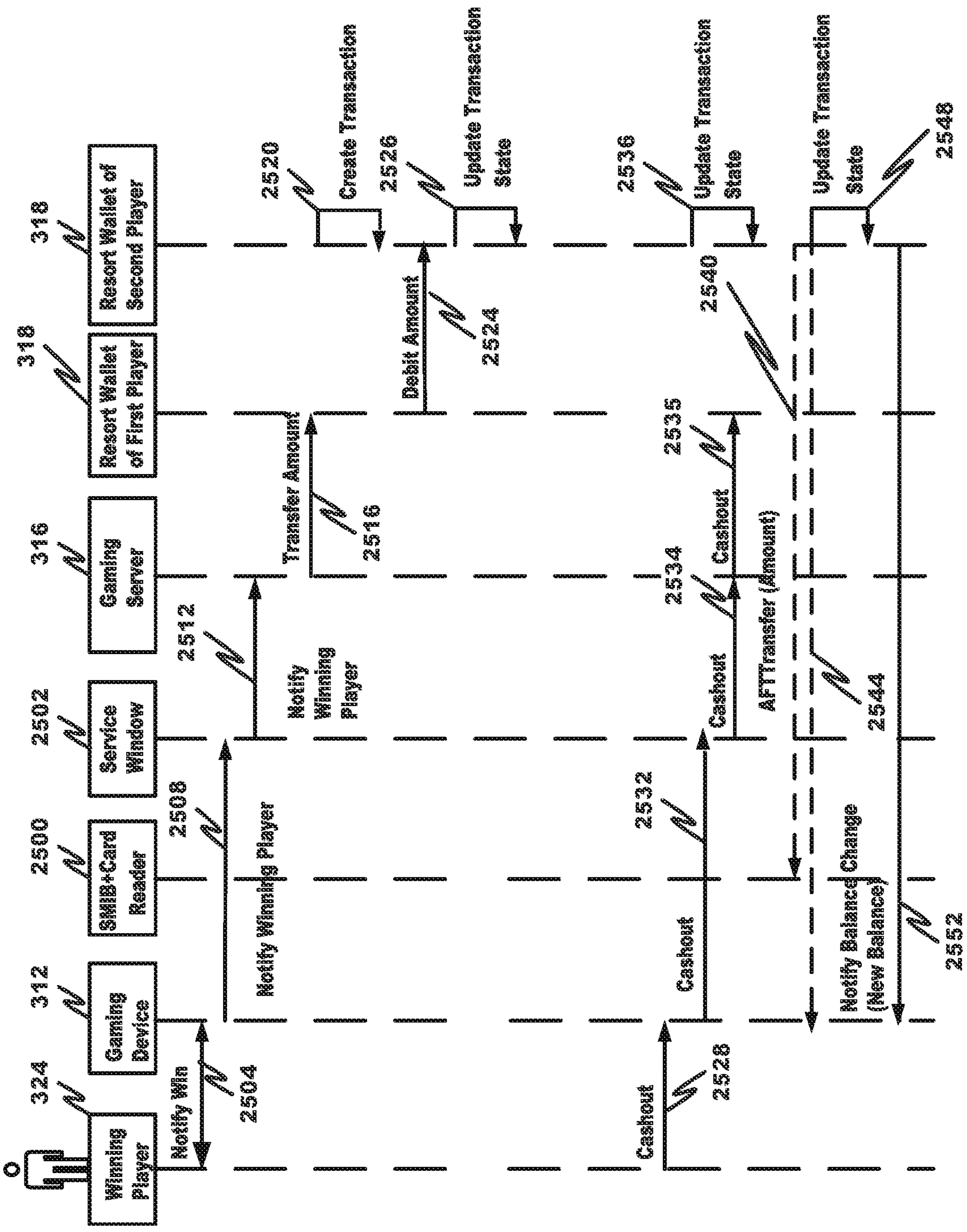
FIG. 25 is a picket fence diagram depicting a series of electronic messages and transactions for transferring an award between players of a multi-player gaming session in accordance with embodiments of the present disclosure.

Further details on the electronic messages used for transferring an award between/among players are shown in FIG. 25 according to an embodiment of the disclosure.

The gaming device 312 notifies the player by electronic or visual display 2504 that he is the winning player in the tournament session and sends an electronic message 2508 to the service window, which forwards the electronic message as message 2512 to the gaming server 316.

In response, the gaming server 316 instructs by electronic message 2516 the database management system of the database 384 to transfer the award amount from the resort wallet of the losing player(s) to the resort wallet of the winning player.

The database management system creates a transaction 2520 and the database management system of the database 384 credits the award amount from the losing player's resort wallet(s) and debits 2524 it to the player's resort wallet. The transaction 2526 is then updated by the database management system of the database 384 to show completion of the transaction.

The player 124 subsequently provides input 2528 to the gaming device 312 that the player desires to cashout the award amount from the player's resort wallet.

In response, the processor of the gaming device 312 notifies the service window 2502 of the gaming device 312 by electronic message 2532 that the award amount is to be cashed out of the player's resort wallet.

In response, the service window 2502 of the gaming device 312 notifies the gaming server 316 by electronic message 2534 that the award amount is to be cashed out of the player's resort wallet.

In response, the gaming server 316 instructs by electronic message 2535 the database management system of the database 384 to transfer the award amount from the resort wallet of the player to the player.

The database management system updates the transaction 2536 and credits the award amount from the player's resort wallet and transfers it to the player.

The transfer can be accomplished in at least two ways. In a first way, an AFFTransfer 2540 from the player's resort wallet to the SMIB and card reader 466 for the ticket issuance device 450. In a second way, an automated file transfer or AFFTransfer 2544 from the player's resort wallet to the gaming device 312 for the currency out device 462.

The transaction 2520 is then updated to show completion of the cashout transaction and an electronic message 2552 sent to the gaming device (or SMIB and card reader) notifying the player of the new balance on the resort wallet.

In another embodiment of the present disclosure, cashless transfers are made to and from the player's resort wallet via an application on the mobile device 314. In that event, the mobile device 314 would interact with the gaming device 312 to perform the steps shown in FIG. 25 above.

In that event, the player 324 using his or her mobile device 314 may be required to establish a pairing or linkage between the mobile device 314 and the gaming device 312. The pairing or linkage between the mobile device and the gaming system (e.g., EGM or kiosk) occurs via one or more applications being run or executed on the mobile device. In certain embodiments, the mobile device application utilized to effect cash transfer to and from the gaming system 300 is a location based digital wallet enabled application, such as a Passbook-enabled or Wallet-enabled application, which is accessible when the player enters a gaming establishment. In certain embodiments, the mobile device application utilized to effect cash transfer to and from the gaming system is downloaded to the mobile device from an application store. In certain embodiments, the mobile device application utilized to transfer cash to and from the gaming system is downloaded to the mobile device from one or more websites affiliated with the gaming establishment (which are accessible directly by the player and/or by a link opened when the player scans a QR code associated with the EGM).

In certain embodiments, after a player has opened an application on a mobile device and selected an action to be performed, the gaming system determines if the mobile device application is associated with an active authorization token previously created by the system. In these embodiments, an authorization token is a time-based token that expires after a designated period of time and that is associated with an additional level of player authentication beyond a player's application username and application password.

If the gaming system determines that the application is not associated with an active authorization token previously created by the system, the mobile device application prompts the player to provide identifying information, such as a personal identification number or biometric identifier. The mobile device application stores the provided identifying information as mobile device encrypted data. Following the player providing identifying information, the mobile device application prompts the player to cause the mobile device to engage a gaming device (or a component of the gaming device), such as prompting the player to tap the mobile device to a designated portion of the gaming device. It should be appreciated that any reference herein to a player tapping the mobile device to a designated portion of the gaming device (or a component of the gaming device) may or may not include the player pressing a fingerprint scanner (if the mobile device is equipped with such a fingerprint scanner) while concurrently engaging the gaming device (or a component of the gaming device). In other embodiments, the mobile device application verifies the identifying information of the player by communicating with a verification/authentication server over one or more wireless communication protocols, such as Wi-Fi protocol, a cellular communication protocol (e.g., 3G or LTE), to obtain the active authorization token.

In certain embodiments, following the player causing the mobile device to engage the gaming device (e.g., the player taps the mobile device to a player tracking card reader or other designated location(s) of the gaming device), the mobile device application communicates, via a wireless communication protocol, the provided identifying information and the requested action to be performed to the gaming device (or to a component associated with the gaming device). For example, upon the player tapping the mobile device to a player tracking card reader or other designated location(s) of the gaming device (or otherwise moving the mobile device to within a designated distance of the player tracking card read or other designated locations(s) of the gaming device), the mobile device application sends the identifying information and the requested action to a component of a gaming establishment management system located inside the gaming device (i.e., a component of the gaming device), such as a NexGen™. player tracking component of an Advantage™ system. NexGen™. and Advantage™.

If the gaming system determines that the identifying information is invalid, the system communicates an invalid identifying information response to the mobile device. For example, an identifying information status message is communicated to the mobile device which reports whether the identifying information is valid or invalid. The mobile device application then displays one or more messages regarding the invalid identifying information and prompts the player to provide identifying information, such as a personal identification number or biometric identifier. In certain such embodiments, if the mobile device receives a communication that the identifying information is invalid (or alternatively in association with the initial creation of a token) and if the mobile device includes a fingerprint scanner, the mobile device application prompts the player to press the fingerprint scanner while engaging the gaming device, such as tapping the mobile device to a designated portion of the gaming device.

On the other hand, if the gaming system determines that the identifying information is valid, the system creates an authorization token. The system associates the authorization token with a timestamp of when the authorization token will expire. In certain embodiments, a cashless system includes a key distribution center which generates a session key to encrypt all cashless messages. The session key is rotated periodically at a configurable rate from 1 hour to 24 hours. In these embodiments, the system utilizes this session key to sign the token data and create a token. As such, the token time-to-live will be less than or equal to the session key rotation period. In other embodiments, such authorization tokens are managed utilizing software (and not a key distribution center).

Following the creation of an authorization token, the gaming system communicates the created authorization token to the mobile device, such as via one or more messages including the created authorization token, for storage by the mobile device application and proceeds with executing one or more of the requested actions and communicating a requested action response to the mobile device. For example, upon the creation of the authorization token, the component of a gaming establishment management system located inside the gaming device (i.e., a component of the gaming device), such as a NexGen™ player tracking component of an Advantage™. system, communicates the created authorization token to the mobile device and proceeds with executing the requested action.

On the other hand, following a determination that the mobile device application is associated with a previously created and stored authentication token, the mobile device application prompts the player to cause the mobile device to engage the gaming device, such as prompting the player to tap the mobile device to a designated portion of the gaming device.

Following the player causing the mobile device to engage the gaming device (e.g., the player taps the mobile device to a player tracking card reader or other designated location(s) of the gaming device), the mobile device application communicates, via a wireless communication protocol, the previously stored authorization token and the requested action to be performed to the gaming device (or to a component associated with the gaming device). For example, upon the player tapping the mobile device to a player tracking card reader or other designated location(s) of the gaming device, the mobile device application sends the stored authorization token and the requested action to a component of a gaming establishment management system located inside the gaming device (i.e., a component of the gaming device), such as a NexGen™ player tracking component of an Advantage™ system.

Following the communication of the stored authorization token and the requested action to the gaming device or a component associated with the gaming device, the system determines if the communicated authorization token is still valid. For example, a gaming system component configured to operate with a player tracking system determines whether the authorization token is valid (i.e., active and non-expired).

If the gaming system determines that the communication authorization token is invalid, the system communicates an invalid authorization token response to the mobile device. The mobile device application then displays one or more messages regarding the invalid authorization token and prompts the player to provide identifying information, such as a personal identification number or biometric identifier, to obtain another authentication token.

On the other hand, if the gaming system determines that the stored authorization token is valid, the system proceeds with executing the requested action. For example, upon the determination that the communicated authorization token is valid, the component of a gaming establishment management system located inside the gaming device proceeds with executing the requested action and communicates a requested action response to the mobile device.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, RAM, ROM, EEPROM or Flash memory, an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PUP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

What is claimed is:

1. A method, comprising:

receiving, by a first user interface of a first electronic gaming device, first credit information regarding a first credit amount associated with a first player;

receiving, by the first user interface of the first electronic gaming device, second credit information regarding a second credit amount associated with a second player;

updating, by a processor, an electronic record associated with a first credit meter associated with the first player to reflect the first credit information, a second credit meter associated with the second player to reflect the second credit information, and a joint credit meter associated with the first and second players to reflect the first and second credit information;

simultaneously displaying, by a display of the first electronic gaming device, the first and second credit amounts and a joint credit amount in the joint credit meter derived from the first and second credit amounts;

receiving, by a processor of the first electronic gaming device, a request to initiate concurrent first and second gaming sessions with the first and second players;

initiating, by the processor of the first electronic gaming device, the concurrent first and second gaming sessions;

upon occurrence of a gaming event, terminating the first and second gaming sessions;

responsive to the terminating, comparing a first credit amount of the first credit meter with a second credit amount of the second credit meter, the first credit amount being greater than the second credit amount; and based on the comparing, updating an electronic record associated with each of the first and second credit meters to transfer at least part of the second credit amount from the second credit meter to the first credit meter.

2. The method of claim 1, wherein the first electronic gaming device comprises first and second player stations for the first and second players and wherein the joint credit amount is a mathematical sum of the first and second credit amounts and further comprising:

receiving third credit information indicating a change in one of the first and second credit amounts;

updating, by the processor, the electronic record associated with a corresponding one of the first and second credit meters to reflect the third credit information and the joint credit meter to reflect the third credit information; and simultaneously displaying, by the display of the first electronic gaming device, a changed one of the first and second credit amounts, the other of the first and second credit amounts, and a changed joint credit amount.

3. The method of claim 2, wherein the change in the third credit information comprises one of: a first wager amount deducted from the first credit meter for a play of a first wagering game of the first electronic gaming device, a second wager amount deducted from the second credit meter for a play of a second wagering game of the first electronic gaming device, an amount added to the first credit meter from a play of the first wagering game, an amount added to the second credit meter from a play of the second wagering game, a cash-out of the first credit meter, a cash-out of the second credit meter, a first player deposit of a first credit amount of funds to the first credit meter, and a second player deposit of a second credit amount of funds to the second credit meter.

4. The method of claim 1, wherein the first electronic gaming device comprises a service window having an electronic address different from an electronic address of the first electronic gaming device, wherein the first, second, and joint credit meters are displaced by the service window, and wherein a joint credit amount in the joint credit meter is maintained unchanged during updating of the electronic record associated with each of the first and second credit meters to transfer at least part of the second credit amount from the second credit meter to the first credit meter.

5. The method of claim 1, wherein the first and second gaming sessions are defined by different first and second pay tables, respectively, and wherein a portion of each of the first and second credit amounts s unavailable for wagering.

6. The method of claim 1, further comprising responsive to updating of the electronic record associated with each of the first and second credit meters to transfer at least part of the second credit amount from the second credit meter to the first credit meter, causing a transfer of credits from the second credit meter to the first credit meter without causing a change to the joint credit meter.

7. The method of claim 1, wherein the first and second gaming sessions are defined by a common pay table and further comprising:

receiving, from a service window of the first electronic gaming device and through a network communications interface, a first electronic message comprising an identifier of the first electronic gaming device, a first identifier of the first player in a gaming session, and a first description of a first game event of the first player in the gaming session the service window having an electronic address different from an electronic address of the first electronic gaming device;

updating a first electronic record associated with the gaming session to reflect the first game event;

receiving, from the service window of the first electronic gaming device and through the network communications interface, a second electronic message comprising the identifier of the first electronic gaming device, a second identifier of a second player in the gaming session, and a second description of a second game event of the second player in the gaming session;

updating a second electronic record associated with the gaming session to reflect the second game event;

at a conclusion of the gaming session, receiving a third electronic message from the service window of first electronic gaming device and comprising the identifier of the first electronic gaming device, one of the first and second identifiers associated with a winning player, and a third description of a third game event, the third description indicating an award to be transferred to the winning player; and updating a third electronic record of the winning player to reflect transfer of the award.

8. An electronic gaming device comprising:

first and second player user interfaces for first and second players, respectively;

first and second credit meters associated with the first and second players, respectively;

a joint credit meter having a joint credit amount derived from the first and second credit meters, a processor coupled with the first and second player user interfaces; and a memory coupled with and readable by the processor and storing therein a set of instructions which, when executed by the processor, causes the processor to:

receive, by the first player user interface, first credit information regarding a first credit amount associated with the first player;

receive, by the second player user interface, second credit information regarding a second credit amount associated with the second player:

update an electronic record associated with a first credit meter associated with the first player to reflect the first credit information, a second credit meter associated with the second player to reflect the second credit information, and a joint credit meter associated with the first and second players to reflect the first and second credit information;

simultaneously display, by a display, the first and second credit amounts and a joint credit amount derived from the first and second credit amounts;

receive a request to initiate concurrent first and second gaming sessions with the first and second players;

initiate the concurrent first and second gaming sessions;

upon occurrence of a gaming event, terminate the first and second gaming sessions;

compare a first credit amount of the first player credit meter with a second credit amount of the second player credit meter; and based on comparison of the first and second credit amounts, update an electronic record associated with each of the first and second credit meters to transfer at least part of the second credit amount from the second credit meter to the first credit meter.

9. The electronic gaming device of claim 8, wherein the electronic gaming device comprises a service window having an electronic address different from an electronic address of the electronic gaming device, wherein the first, second, and joint credit meters are displayed by the service window, and wherein the first and second gaming sessions are defined by different first and second pay tables, respectively.

10. The electronic gaming device of claim 8, wherein the first and second gaming sessions are defined by a common pay table.

11. The electronic gaming device of claim 8, further comprising first and second player stations for the first and second players comprising the first and second player user interfaces respectively and wherein the set of instructions, when executed by the processor, further causes the processor to:

receive third credit information indicating a change in one of the first and second credit amounts;

update the electronic record associated with a corresponding one of the first and second credit meters to reflect the third credit information and the joint credit meter to reflect the third credit information; and simultaneously display, by the display, a changed one of the first and second credit amounts, the other of the first and second credit amounts, and a changed joint credit amount.

12. The electronic gaming device of claim 11, wherein the change in the third credit information comprises one of: a first wager amount deducted from the first credit meter for a play of a first wagering game of the electronic gaming device, a second wager amount deducted from the second credit meter for a play of a second wagering game of the electronic gaming device, an amount added to the first credit meter from a play of the first wagering game, an amount added to the second credit meter from a play of the second wagering game, a cash-out of the first credit meter, a cash-out of the second credit meter, a first player deposit of a first amount of funds to the first credit meter, and a second player deposit of a second amount of funds to the second credit meter.

13. The electronic gaming device of claim 8, wherein a gaming server is configured to:
- receive, through a network communications interface, a first electronic message addressed to a service window and comprising an identifier of the electronic gaming device, a first Identifier of the first player in a gaming session, and a first description of a first game event of the first player in the gaming session, the service window being associated with an electronic address different from an electronic address of the electronic gaming device;
- update a first electronic record associated with the gaming session to reflect the first game event;
- receive, from the service window of the electronic gaming device and through the network communications interface, a second electronic message comprising the Identifier of the electronic gaming device, a second Identifier of a second player in the gaming session, and a second description of a second game event of the second player in the gaming session;
- update a second electronic record associated with the gaming session to reflect the second game event;
- at a conclusion of the gaming session, receive from the service window a third electronic message comprising the Identifier of the electronic gaming device, one of the first and second identifiers associated with a winning player, and a third description of a third game event, the third description indicating an award to be transferred to the winning player; and
- update a third electronic record of the winning player to reflect transfer of the award.

14. The electronic gaming device of claim 8, wherein the set of instructions, when executed by the processor, further causes the processor, responsive to transfer of the award, to cause a transfer of credits from the second credit meter to the first credit meter without causing a change to the joint credit meter.

15. An electronic gaming device comprising:
- first and second player user interfaces for first and second players, respectively;
- first and second credit meters associated with the first and second players, respectively;
- a joint credit meter having a joint credit amount derived from the first and second credit meters;
- a processor coupled with the first and second player user interfaces; and
- a memory coupled with and readable by the processor and storing therein a set of instructions which, when executed by the processor, causes the processor to:
- receive, by a first player user interface, first credit information regarding a first credit amount associated with the first player;
- receive, by the second player user interface, second credit information regarding a second credit amount associated with the second player;
- update an electronic record associated with a first credit meter associated with the first player to reflect the first credit information, a second credit meter associated with the second player to reflect the second credit information, and a joint credit meter associated with the first and second players to reflect the first and second credit information; and
- simultaneously display, by a display, the first and second credit amounts and a joint credit amount derived from the first and second credit amounts receive a request to initiate concurrent first and second gaming sessions with the first and second players;
- initiate the concurrent first and second gaming sessions;
- upon occurrence of a gaming event, terminate the first and second gaming sessions;
- compare a first credit amount of the first credit meter with a second credit amount of the second credit meter; and
- based on comparison of the first and second credit amounts, update an electronic record associated with each of the first and second credit meters to transfer at least part of the second credit amount from the second credit meter to the first credit meter, wherein a joint credit amount in the joint credit meter is maintained unchanged during updating of the electronic record associated with each of the first and second credit meters to transfer at least part of the second credit amount from the second credit meter to the first credit meter.

16. The electronic gaming device of claim 15, wherein the electronic gaming device comprises a service window having an electronic address different from an electronic address of the electronic gaming device, wherein the first, second, and joint credit meters are displayed by the service window, and wherein the first and second gaming sessions are defined by different first and second pay tables, respectively.

17. The electronic gaming device of claim 15, further comprising first and second player stations for the first and second players comprising the first and second player user interfaces respectively and wherein the set of instructions, when executed by the processor, further causes the processor to:
- receive third credit information indicating a change in one of the first and second credit amounts;
- update the electronic record associated with a corresponding one of the first and second credit meters to reflect the third credit information and the joint credit meter to reflect the third credit information; and
- simultaneously display, by the display, a changed one of the first and second credit amounts, the other of the first and second credit amounts, and a changed joint credit amount.

18. The electronic gaming device of claim 17, wherein the change in the third credit information comprises one of: a first wager amount deducted from the first credit meter for a play of a first wagering game of the electronic gaming device, a second wager amount deducted from the second credit meter for a play of a second wagering game of the electronic gaming device, an amount added to the first credit meter from a play of the first wagering game, an amount added to the second credit meter from a play of the second wagering game, a cash-out of the first credit meter, a cash-out of the second credit meter, a first player deposit of a first amount of funds to the first credit meter, and a second player deposit of a second amount of funds to the second credit meter.

19. The electronic gaming device of claim 15, wherein a gaming server is configured to:
- receive, through a network communications interface, a first electronic message addressed to a service window and comprising an identifier of the electronic gaming device, a first Identifier of the first player in a gaming session, and a first description of a first game event of the first player in the gaming session, the service window having a different electronic address than an electronic address of the electronic gaming device;

update a first electronic record associated with the gaming session to reflect the first game event;

receive, through the network communications interface, a second electronic message addressed to the service window and comprising the identifier of the electronic gaming device, a second identifier of a second player in the gaming session, and a second description of a second game event of the second player in the gaming session;

update a second electronic record associated with the gaming session to reflect the second game event;

at a conclusion of the gaming session, receive a third electronic message addressed to the service window and comprising the Identifier of the electronic gaming device, one of the first and second Identifiers associated with a winning player, and a third description of a third game event, the third description indicating an award to be transferred to the winning player; and update a third electronic record of the winning player to reflect transfer of the award.

20. The electronic gaming device of claim 15, wherein the first and second gaming sessions are defined by a common pay table and wherein the set of instructions, when executed by the processor, further causes the processor, responsive to transfer of the award, to cause a transfer of credits from the second credit meter to the first credit meter without causing a change to the joint credit meter.

* * * * *